US012370789B2

(12) United States Patent
King et al.

(10) Patent No.: US 12,370,789 B2
(45) Date of Patent: Jul. 29, 2025

(54) STENCIL PRINTER COVER

(71) Applicant: Illinois Tool Works Inc., Glenview, IL (US)

(72) Inventors: Kenneth J. King, East Freetown, MA (US); James Lynch, Uxbridge, MA (US); Patsy A. Mattero, Smithfield, RI (US); William A. Losiewicz, Douglas, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/876,989

(22) Filed: Jul. 29, 2022

(65) Prior Publication Data

US 2024/0034049 A1 Feb. 1, 2024

(51) Int. Cl.
*B41F 15/08* (2006.01)
*B41F 15/34* (2006.01)

(52) U.S. Cl.
CPC .............. *B41F 15/34* (2013.01); *B41F 15/08* (2013.01); *B41P 2215/10* (2013.01)

(58) Field of Classification Search
CPC ....... B41F 15/08; B41F 15/34; B41P 2215/10
See application file for complete search history.

(56) References Cited

U.S. PATENT DOCUMENTS 6,453,810 B1 * 9/2002 Rossmeisl ............ B23K 3/0607 101/114
2001/0011506 A1 * 8/2001 Rossmeisl ............ B23K 3/0692 101/123
2009/0205569 A1 * 8/2009 Perault ............... H05K 13/0465 118/713

(Continued)

FOREIGN PATENT DOCUMENTS

| | | | |
|---|---|---|---|
| CN | 204728942 U | * | 10/2015 |
| CN | 218481403 U | * | 2/2023 |

(Continued)

OTHER PUBLICATIONS

International Search Report and Written Opinion from International Application No. PCTIUS2023/023719 dated Jul. 28, 2023.

*Primary Examiner* — Christopher E Mahoney
*Assistant Examiner* — Marissa Ferguson-Samreth
(74) *Attorney, Agent, or Firm* — Lando & Anastasi, LLP

(57) ABSTRACT

A stencil printer includes a frame, a stencil, a support assembly, and a print head, and a print head assembly supported by the print head gantry in such a manner that the print head assembly is configured to traverse the stencil during print strokes. The support assembly supports the electronic substrate in a print position beneath the stencil. The print head assembly includes a print head a squeegee blade assembly configured to roll solder paste along the stencil. The stencil printer further includes a cover coupled to the frame to enclose operating components of the stencil printer, including the stencil, the support assembly, the print head gantry and the print head assembly. The cover includes an elongate opening formed therein and a movable door configured to selectively close the elongate opening. The elongate opening is sized to enable the stencil and/or a tooling tray to pass through.

15 Claims, 13 Drawing Sheets

(56) References Cited

U.S. PATENT DOCUMENTS

| | | | | |
|---|---|---|---|---|
| 2012/0285708 | A1* | 11/2012 | Bildstein | B41J 29/377 169/46 |
| 2018/0229495 | A1* | 8/2018 | Yamamoto | B41F 33/00 |
| 2020/0396843 | A1* | 12/2020 | Losiewicz | B41M 1/12 |
| 2021/0197545 | A1 | 7/2021 | Yokoi | |
| 2022/0227120 | A1* | 7/2022 | Mattero | B41L 13/02 |
| 2024/0034048 | A1* | 2/2024 | Lynch | B41F 15/12 |

FOREIGN PATENT DOCUMENTS

| | | | | | |
|---|---|---|---|---|---|
| CN | 218532837 | U | * | 2/2023 | |
| CN | 116829360 | A | * | 9/2023 | B41F 15/0881 |
| JP | 2000103031 | A | | 4/2000 | |
| JP | 2018118407 | A | * | 8/2018 | |
| KR | 2011 0093617 | A | | 8/2011 | |
| WO | WO-2018105016 | A1 | * | 6/2018 | B41F 15/0881 |

* cited by examiner

STENCIL PRINTER COVER

BACKGROUND OF THE DISCLOSURE

1. Field of Invention

This application relates generally to stencil printers and related methods to print viscous materials, e.g., solder paste, on an electronic substrate, e.g., a printed circuit board (PCB), and more particularly to systems and methods for replacing items in a stencil printer.

2. Discussion of Related Art

In manufacturing a surface-mount printed circuit board, a stencil printer can be used to print solder paste onto the circuit board. Typically, a circuit board having a pattern of pads or some other conductive surface onto which solder paste will be deposited is automatically fed into the stencil printer; and one or more small holes or marks (known as "fiducials") on the circuit board are used to properly align the circuit board with the stencil or screen of the stencil printer prior to printing solder paste onto the circuit board. In some systems, an optical alignment system embodying a vision system is used to align the circuit board with the stencil.

Once the circuit board has been properly aligned with the stencil in the printer, the circuit board is raised to the stencil, solder paste is dispensed onto the stencil, and a wiper blade (or squeegee) traverses the stencil to force the solder paste through apertures in the stencil and onto the circuit board. As the squeegee is moved across the stencil, the solder paste tends to roll in front of the blade, which desirably causes mixing and shearing of the solder paste so as to attain a desired viscosity to facilitate filling of the apertures in the screen or stencil. The solder paste typically is dispensed onto the stencil from a standard cartridge. The stencil is then separated from the circuit board and the adhesion between the circuit board and the solder paste causes most of the material to stay on the circuit board. Material left on the surface of the stencil is removed in a cleaning process before additional circuit boards are printed.

Another process in the printing of circuit boards involves inspection of the circuit boards after solder paste has been deposited on the surface of the circuit boards. Inspecting the circuit boards is important for determining that clean electrical connections can be made. An excess of solder paste can lead to shorts, while too little solder paste in appropriate positions can prevent electrical contact. Generally, the vision inspection system is further employed to provide a two-dimensional or a three-dimensional inspection of the solder paste on the circuit board.

Present day stencil printers require manual intervention to perform routine operations. For example, during a changeover, an operator must perform many manual tasks, such as changing a stencil, replacing a solder paste cartridge, replacing squeegee blades, and replacing support tooling. Each of these tasks require the operator to manually perform the task. For example, with most stencil printers, the operator must unlock the stencil, remove the stencil, properly insert a replacement stencil, and lock the replacement stencil in place. A changeover operation can take as long as 30 minutes, during which the stencil printer is not operating, which may result in the PCB fabrication line not operating.

SUMMARY OF THE DISCLOSURE

One aspect of the present disclosure is directed to a stencil printer for printing an assembly material on an electronic substrate. In one embodiment, the stencil printer comprises a frame, a stencil coupled to the frame, a support assembly coupled to the frame, and a print head gantry coupled to the frame, and a print head assembly supported by the print head gantry in such a manner that the print head assembly is configured to traverse the stencil during print strokes. The stencil has apertures formed therein. The support assembly is configured to support the electronic substrate in a print position beneath the stencil. The print head assembly includes a print head having a squeegee blade assembly configured to roll solder paste along the stencil. The stencil printer further comprises a cover coupled to the frame to enclose operating components of the stencil printer, including the stencil, the support assembly, the print head gantry and the print head assembly. The cover includes an elongate opening formed therein and a movable door configured to selectively close the elongate opening. The elongate opening is sized to enable the stencil and/or a tooling tray to pass through.

Embodiments of the stencil printer further may include hingedly mounting the cover to the frame of the stencil printer, the cover being movable between a closed position and an open position. The cover may include a cover frame and at least one panel secured to the cover frame. The movable door may be slidably coupled to the cover frame to enable movement of the movable door with respect to the cover between a closed position and an open position. The movable door may include a movable door frame and at least one panel secured to the movable door frame. The cover may include a linear slide mounted on the cover frame of the cover. The movable door may include a mounting bracket secured to the movable door frame of the movable door. The cover may include a first linear slide secured to the cover frame of the cover on one side of the movable door and a second linear slide secured to the cover frame of the cover on the other side of the movable door. The movable door may include at least one first mounting bracket secured to the movable door frame of the movable door on one side of the movable door and at least one second mounting bracket secured to the movable door frame of the movable door on the other side of the movable door. The cover may include a pneumatic interlock assembly to secure the position of the movable door in the closed position. The pneumatic interlock assembly may include an interlock latch provided on one of the movable door and the cover and an interlock cylinder provided on the other of the movable door and the cover. The interlock cylinder may be configured to releasably secure the interlock latch to secure the movable door in the closed position. The pneumatic interlock assembly may include a safety switch transmitter provided on one of the movable door and the cover and a safety switch receiver provided on the other of the movable door and the cover to ensure that the movable door is in a closed position prior to operating the stencil printer. The movable door may be configured to be moved by at least one lift bracket associated with a movable cart. The movable door may be an access panel hingedly mounted to a frame of the movable door. The access panel may be configured to be manipulated manually between open and closed positions.

Another aspect of the present disclosure is directed to a cover for a stencil printer used to print an assembly material on an electronic substrate. In one embodiment, the cover comprises a cover frame and a panel secured to the cover frame. The cover includes an elongate opening formed therein and a movable door configured to selectively close the elongate opening. The elongate opening is sized to enable the stencil and/or a tooling tray to pass through.

Embodiments of the cover further may include hingedly mounting the cover to a frame of the stencil printer, the cover being movable between a closed position and an open position. The movable door may be slidably coupled to the cover frame to enable movement of the movable door with respect to the cover between a closed position and an open position. The movable door may include a movable door frame and at least one panel secured to the movable door frame. The cover may include a linear slide mounted on the cover frame of the cover. The movable door may include a mounting bracket secured to the movable door frame of the movable door. The cover may include a first linear slide secured to the cover frame of the cover on one side of the movable door and a second linear slide secured to the cover frame of the cover on the other side of the movable door. The movable door may include at least one first mounting bracket secured to the movable door frame of the movable door on one side of the movable door and at least one second mounting bracket secured to the movable door frame of the movable door on the other side of the movable door. The cover may include a pneumatic interlock assembly to secure the position of the movable door in the closed position. The pneumatic interlock assembly may include an interlock latch provided on one of the movable door and the cover and an interlock cylinder provided on the other of the movable door and the cover, the interlock cylinder being configured to releasably secure the interlock latch to secure the movable door in the closed position. The pneumatic interlock assembly may include a safety switch transmitter provided on one of the movable door and the cover and a safety switch receiver provided on the other of the movable door and the cover to ensure that the movable door is in a closed position prior to operating the stencil printer. The movable door may be configured to be moved by at least one lift bracket associated with a movable cart. The movable door may include an access panel hingedly mounted to a frame of the movable door. The access panel may be configured to be manipulated manually between open and closed positions.

Yet another aspect of the present disclosure is directed to a method of presenting a stencil or items within a stencil printer. In one embodiment, the method comprises inserting the stencil and/or a tooling tray into an elongate opening provided in a cover of the stencil printer.

Embodiments of the method further may include moving a movable door configured to close the elongate opening with a lift bracket of a movable cart. The method further may include manually moving an access panel of the movable door to an open position to enable inserting the stencil and/or tooling tray into the elongate opening.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
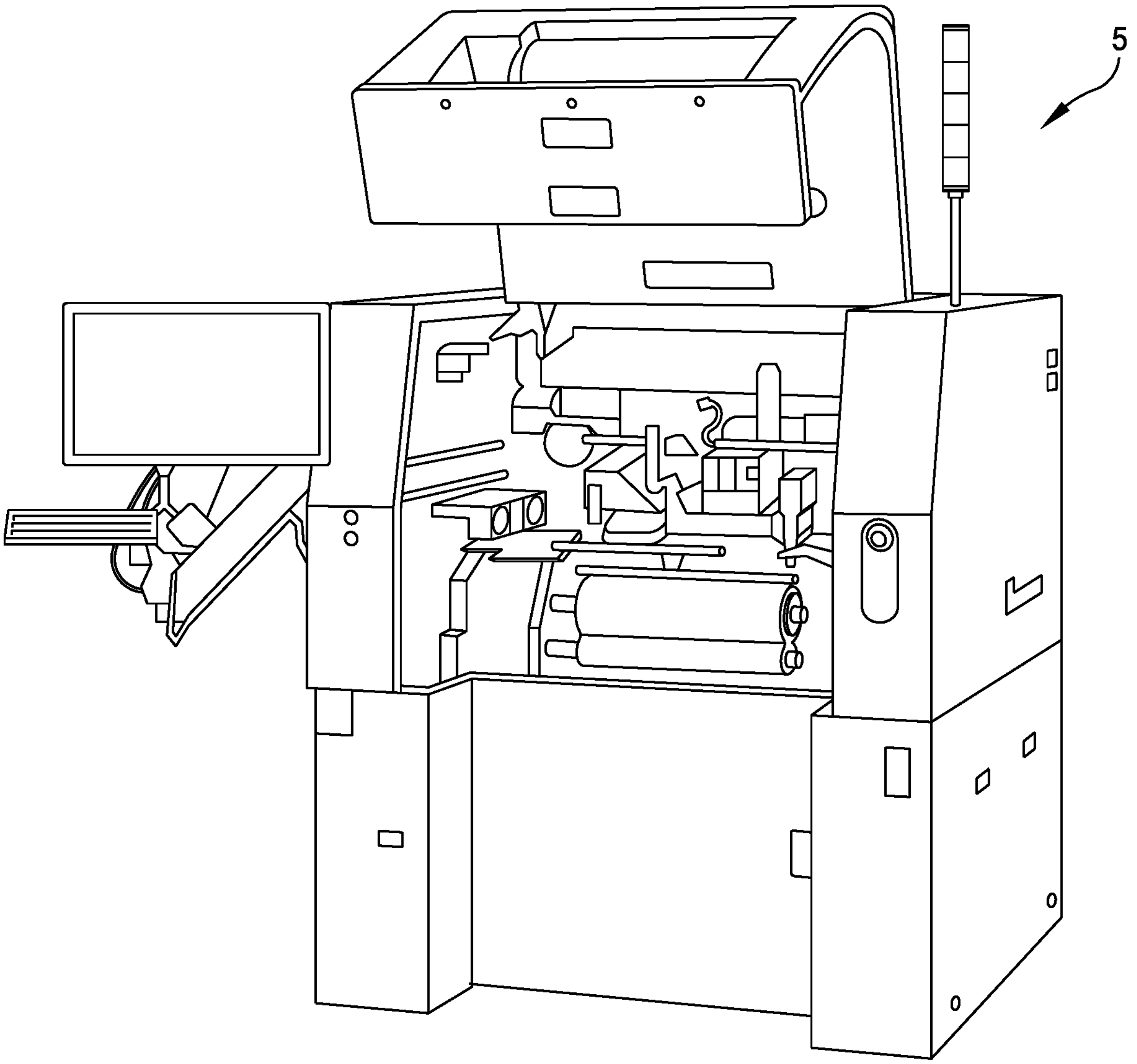
FIG. 1 (PRIOR ART)
FIG. 1 is a front view of a stencil printer.

The present disclosure relates generally to material application machines (referred to herein as “stencil printers,” “screen printers,” “printing machines,” or “printers”) and other equipment utilized in a surface mount technology (SMT) process lines and configured to apply an assembly material (e.g., solder paste, conductive ink, or encapsulation material) onto a substrate (e.g., a printed circuit board, referred to herein as an “electronic substrate,” a “circuit board,” a “board,” a “PCB,” a “PCB substrate,” a “substrate,” or a “PCB board”) or to perform other operations, such as inspection, rework, or placement of electronic components onto a substrate. Specifically, embodiments of the present disclosure are described below with reference to stencil printers used to produce printed circuit boards.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

For purposes of illustration, embodiments of the present disclosure will now be described with reference to a stencil printer used to print an assembly material, such as solder paste, onto a circuit board. One skilled in the art will appreciate, however, that embodiments of the present disclosure are not limited to stencil printers that print solder paste onto circuit boards, but rather, may be used in other applications requiring dispensing of other viscous assembly materials, such as glues and encapsulants. For example, the apparatus may be used to print epoxy for use as underfill for chip-scale packages. Further, stencil printers in accordance with embodiments of the present disclosure are not limited to those that print assembly materials on circuit boards, but rather, include those used for printing other materials on a variety of substrates, such as semiconductor wafers. Also, the terms screen and stencil may be used interchangeably herein to describe a device in a printer that defines a pattern to be printed onto a substrate. In certain embodiments, the stencil printer may include a Momentum® or an Edison™ series stencil printer platform offered by ITW Electronic Assembly Equipment of Hopkinton, Massachusetts. An exemplary stencil printer is generally designated at 5 in FIG. 1. In this embodiment, the stencil printer 5 is a Momentum® series stencil printer platform offered by ITW Electronic Assembly Equipment of Hopkinton, Massachusetts.

Figure 2:
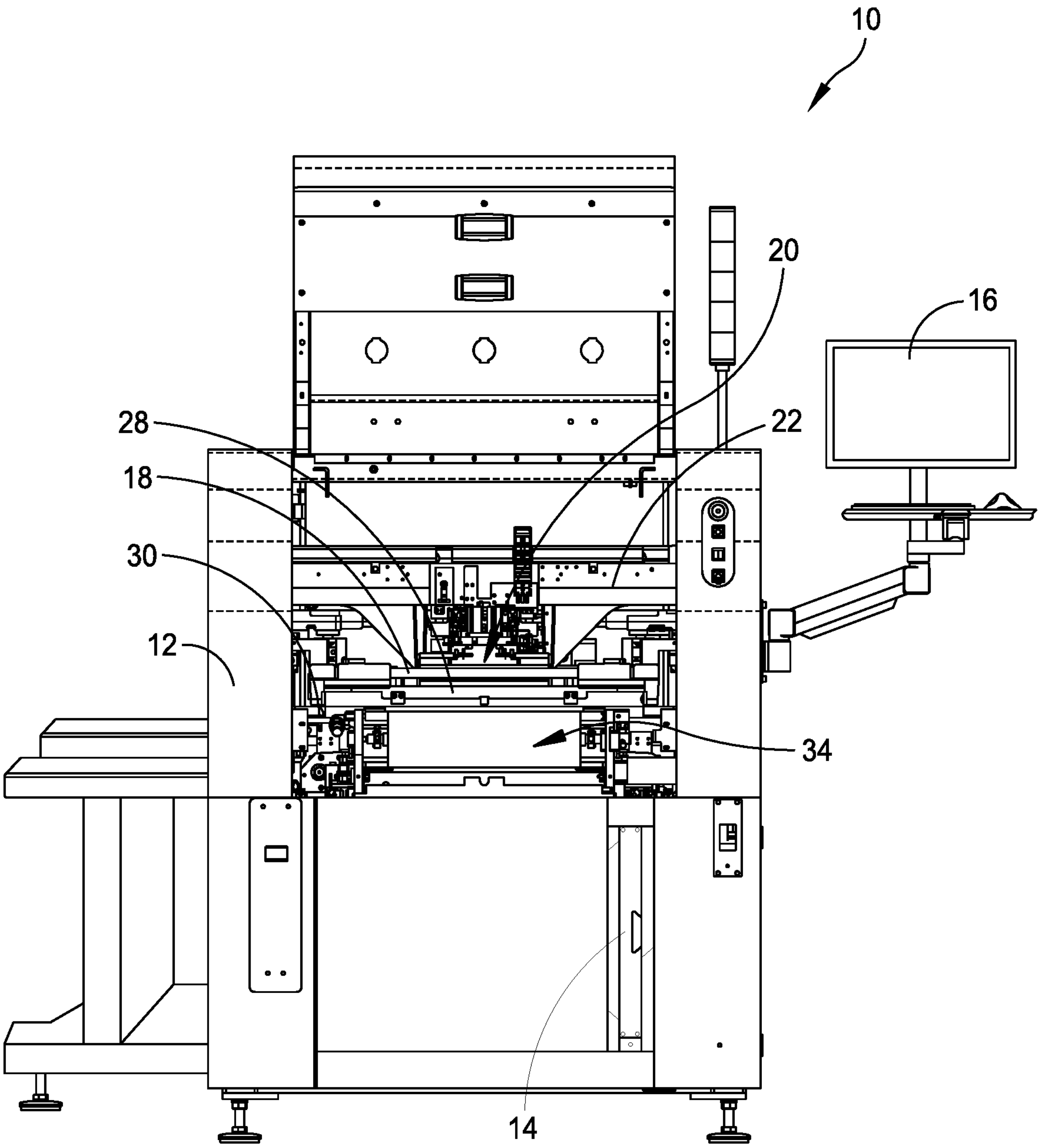
FIG. 2 is a front perspective view of a stencil printer.

Referring to FIG. 2, there is generally indicated at 10 a stencil printer of an embodiment of the disclosure. As shown, the stencil printer 10 includes a frame 12 that supports components of the stencil printer. The components of the stencil printer may include, in part, a controller 14, a display 16, a stencil 18, and a print head or print head assembly, generally indicated at 20, which is configured to apply the solder paste in a manner described in greater detail below.

As shown in FIG. 2 and described below, the stencil and the print head assembly may be suitably coupled or otherwise connected to the frame 12. In one embodiment, the print head assembly 20 may be mounted on a print head assembly gantry 22, which may be mounted on the frame 12. The print head assembly gantry 22 enables the print head assembly 20 to be moved in the y-axis direction under the control of the controller 14 and to apply pressure on the print head assembly as it engages the stencil 18. In a certain embodiment, the print head assembly 20 may be placed over the stencil 18 and may be lowered in the z-axis direction into contact and sealingly engage the stencil.

The stencil printer 10 may also include a conveyor system having rails (not shown) for transporting a printed circuit board (sometimes referred to as a "printed wiring board," "substrate," or "electronic substrate" herein) to a print position in the stencil printer. The rails sometimes may be referred to herein as a "tractor feed mechanism," which is configured to feed, load or otherwise deliver circuit boards to the working area of the stencil printer, which may be referred to herein as a "print nest," and to unload circuit boards from the print nest.

Figure 3:
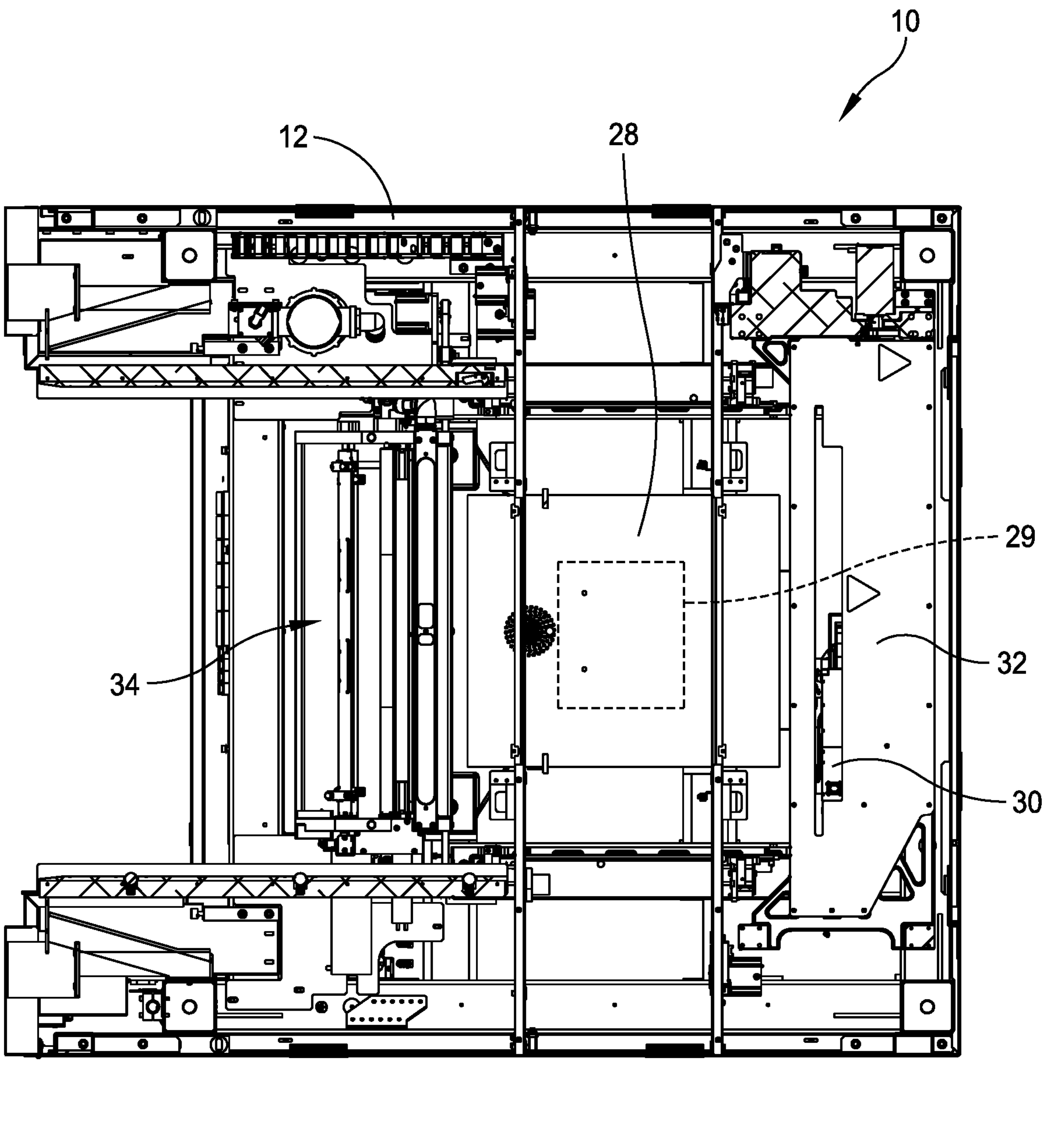
FIG. 3 is a top plan view of the stencil printer illustrated in FIG. 2 with portions removed.

Referring additionally to FIG. 3, the stencil printer 10 has a support assembly 28 to support the circuit board 29 (shown in dashed lines), which raises and secures the circuit board so that it is stable during a print operation. In certain embodiments, the substrate support assembly 28 further may include a particular substrate support system, e.g., a solid support, a plurality of pins or flexible tooling, which is positioned beneath the circuit board when the circuit board is in the print position. The substrate support system may be used, in part, to support the interior regions of the circuit board to prevent flexing or warping of the circuit board during the print operation.

In one embodiment, the print head assembly 20 may be configured to receive solder paste from a source, such as a dispenser, e.g., a solder paste cartridge, that provides solder paste to the print head assembly during the print operation. Other methods of supplying solder paste may be employed in place of the cartridge. For example, solder paste may be manually deposited between the blades or from an external source. Additionally, in a certain embodiment, the controller 14 may be configured to use a personal computer having a suitable operating system, such as a Microsoft Windows® operating system provided by Microsoft Corporation, with application specific software to control the operation of the stencil printer 10. The controller 14 may be networked with a master controller that is used to control a production line for fabricating circuit boards.

In one configuration, the stencil printer 10 operates as follows. A circuit board 29 is loaded into the stencil printer 10 using the conveyor rails. The support assembly 28 raises and secures the circuit board 29 to a print position. The print head assembly 20 is then lowered in the z-axis direction until blades of the print head assembly contact the stencil 18 at a desired pressure. The print head assembly 20 is then moved in the y-axis direction across the stencil 18 by the print head assembly gantry 22. The print head assembly 20 deposits solder paste through apertures in the stencil 18 and onto the circuit board 29. Once the print head assembly has fully traversed the stencil 18 across the apertures, the print head assembly is lifted off the stencil and the circuit board 29 is lowered back onto the conveyor rails. The circuit board 29 is released and transported from the stencil printer 10 so that a second circuit board may be loaded into the stencil printer. To print on the second circuit board 29, the print head assembly is lowered in the z-axis direction into contact with the stencil and moved across the stencil 18 in the direction opposite to that used for the first circuit board.

An imaging system 30 may be provided for the purposes of aligning the stencil 18 with the circuit board 29 prior to printing and to inspect the circuit board after printing. In one embodiment, the imaging system 30 may be disposed between the stencil 18 and the support assembly 28 upon which a circuit board is supported. The imaging system 30 is coupled to an imaging gantry 32 to move the imaging system. In one embodiment, the imaging gantry 32 may be coupled to the frame 12, and includes a beam that extends between side rails of the frame 12 to provide back and forth movement of the imaging system 30 over the circuit board 29 in a y-axis direction. The imaging gantry 32 further may include a carriage device, which houses the imaging system 30, and is configured to move along the length of the beam in an x-axis direction. The construction of the imaging gantry 32 used to move the imaging system 30 is well known in the art of solder paste printing. The arrangement is such that the imaging system 30 may be located at any position below the stencil 18 and above the circuit board 29 to capture an image of predefined areas of the circuit board or the stencil, respectively.

After one or more applications of the solder paste to circuit boards, excess solder paste may accumulate at the bottom of the stencil 18 and a stencil wiper assembly, generally indicated at 34, and may move beneath the stencil to remove the excess solder paste. In other embodiments, the stencil 18 may be moved over the stencil wiper assembly.

As mentioned above, stencil printers require manual intervention to perform replacement of certain parts and/or replenishment operations. For example, a typical stencil requires replacement after a certain period of time, e.g., four hours. Also, stencils need replacement for separate production runs. In addition, solder paste cartridges, which supply temperature-controlled solder paste to the stencil printer, require replacement over time, e.g., within four hours or less. A separate production run may require a different solder paste material. Another item requiring periodic replacement is squeegee blades, which are subject to wearing during use. And finally, tooling used to support a substrate in a print position is subject to replacement when changing from one production product to another.

In one embodiment, a method of replacing a stencil and/or items placed on tooling trays may include, when a request for a new stencil and/or item on a tooling tray is made, either for a new production run or because of wear on an existing stencil, a clean stencil and/or item is provided on a movable cart. At the production line, the "dirty" or used stencil and/or item is removed from the stencil printer and the "clean" or new stencil and/or item is inserted into the stencil printer from the movable cart and secured for use. The dirty stencil and/or item may then be transported to a cleaning station where the stencil and/or item is cleaned and ready for reuse. Once cleaned, the stencil and/or item may be transported back to the stencil printer or a stockroom, where the stencil and/or item can be reused during the same or different production run.

Embodiments of the present disclosure are directed to a delivery system that is configured to automate a changeover process for a stencil printer and to implement one or more of the methods described herein. In one embodiment, the delivery system includes a movable cart that is configured to engage a stencil printer to supply and receive replacement and replenishment parts and materials to the stencil printer. For example, the stencil printer may include a docking station that is configured to receive the movable cart. The docking station may include an interface that enables the movable cart to communicate with the stencil printer. A single movable cart may be configured to include changeover stencils and/or replacement stencils. During a changeover, for example, the stencil printer must be reconfigured to produce different items. Thus, a new stencil may be employed within the stencil printer to produce a different product.

The changeover process described herein can be achieved by a single movable cart that is configured to replace and/or replenish each item. In other embodiments, more than one movable cart can be provided. For example, for stencil changeover, the movable cart is configured to support a predetermined number of stencils. The movable cart and/or the stencil printer can be configured to identify the stencils, store the stencils, transport the stencils to and from the stencil printer, inspect the stencils, and interface with the stencil printer. The movable cart also may be configured to remove used parts, such as stencils, from the stencil printer.

Embodiments of the present disclosure are further directed to a delivery system that is configured to automate a replenishment process for a stencil printer. In one embodiment, the delivery system includes a movable cart that is configured to engage a stencil printer to supply and receive replacement and replenishment parts and materials to the stencil printer. For example, the stencil printer may include a docking station that is configured to receive the movable cart. The docking station may include an interface that enables the movable cart to communicate with the stencil printer. A single movable cart may be configured to include changeover stencils and replacement stencils.

Figure 4:
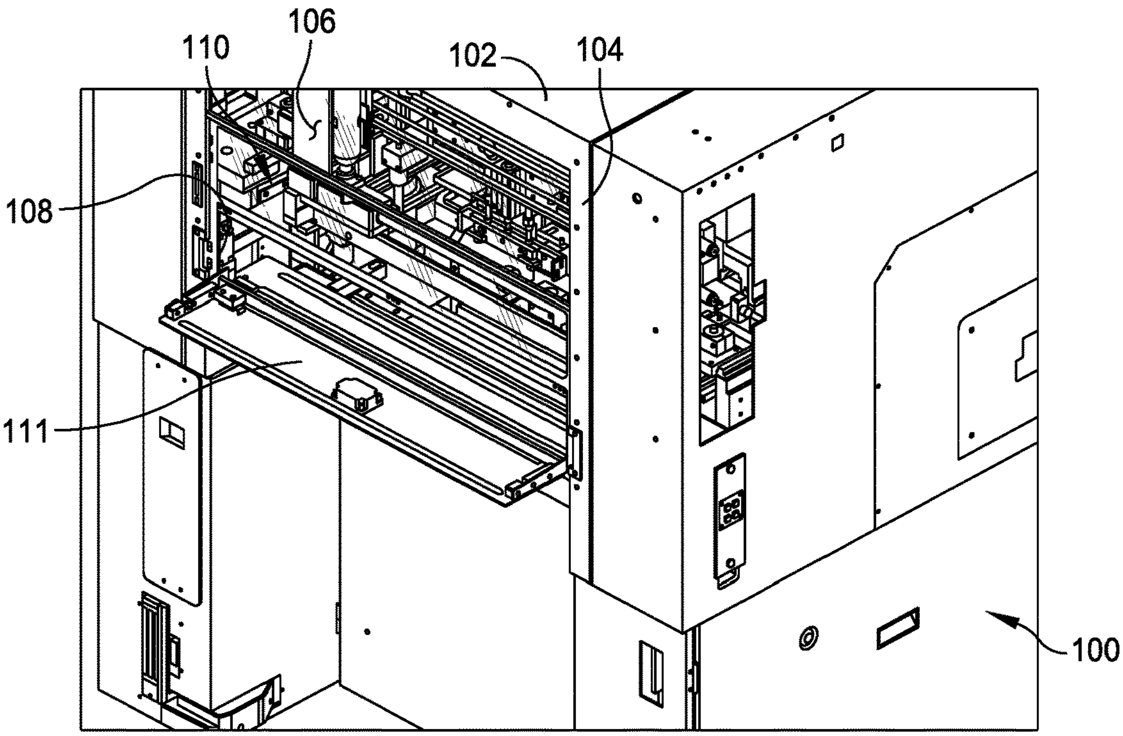
FIG. 4 is a perspective view of a portion of a cover of a stencil printer of an embodiment of the present disclosure, the cover having a movable door configured to enclose a slot, the movable door being shown in an open position.

Referring to FIG. 4, a stencil printer, generally indicated at 100, unless described differently, is substantially identical to stencil printer 10 described above. The stencil printer 100 includes a cover generally indicated at 102 that is hingedly secured to the frame of the stencil printer to move from an open position in which the interior of the stencil printer is accessible to a shown closed position in which the operating components of the stencil printer described above are enclosed. In a certain embodiment, the cover 102 of the stencil printer 100 is fabricated from a metallic frame 104 having panels embodying a see-through material, e.g., plexiglass, each indicated at 106, to enable an operator to view the working components of the stencil printer 100 during operation.

As shown, the cover 102 includes an elongate slot 108, which enables stencils and items positioned in tooling trays to be inserted and removed from the stencil printer 100. The cover 102 further includes a movable door, generally indicated at 110, that is slidably mounted along opposite edges of the elongate slot 108 and sized to enclose the elongate slot when in a closed position. The movable door 110 is configured to move up-and-down with respect to the cover. In one embodiment, the movable door 110 includes an access panel 111, hingedly attached to the frame 104 of the cover enable an operator to manually insert and retrieve items from the stencil printer 100 through the elongate slot 108.

Figure 5:
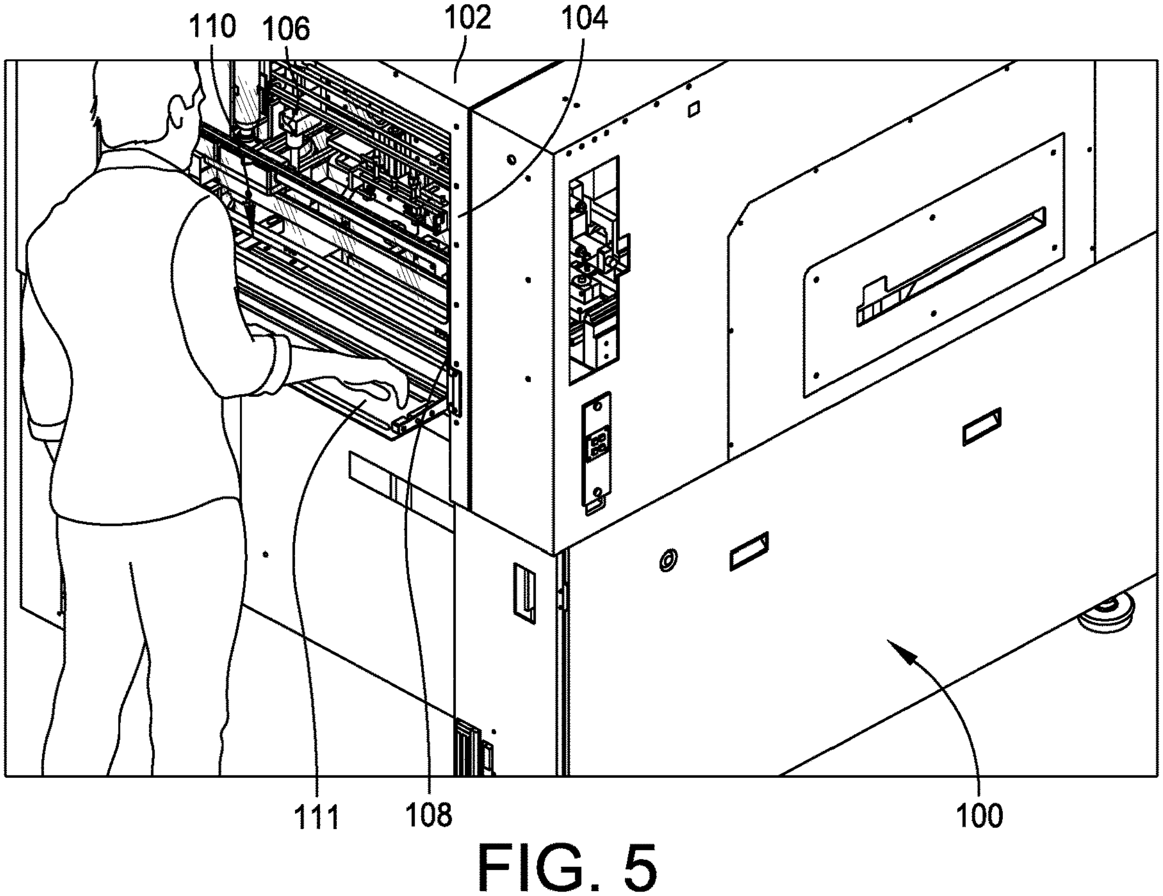
FIG. 5 is a perspective view of the portion of the cover of the stencil printer shown in FIG. 4, with an operator presenting an item to the stencil printer.

FIG. 4 illustrates the access panel 111 of the movable door 110 shown in an open position to enable a stencil or items on a tooling tray, such as squeegee blades and tooling, to be inserted into and retrieved from the stencil printer. Specifically, when the access panel 111 of the movable door 110 is in the open position, the elongate slot 108 functions as a mail slot to enable a partially automated replacement of items, including the stencil, squeegee blades and tooling. An operator can present the stencil and/or tooling tray to the elongate slot, and an end effector or tooling load/unload mechanism associated with the print head of the stencil printer 100 retrieves and returns the stencil and/or tooling tray back to the operator. FIG. 5 illustrates an operator presenting an item to the stencil printer 100 through the elongate slot 108, with the access panel 111 being shown in the open position.

During a product changeover, the software associated with the controller of the stencil printer 100 prompts the operator to load or replace the required item(s), walking the operator through the process step-by-step. Once loaded and production is ready to resume the stencil printer 100 scans each new item added to verify that the correct items for the print job have been loaded prior to continuing.

Figure 6:
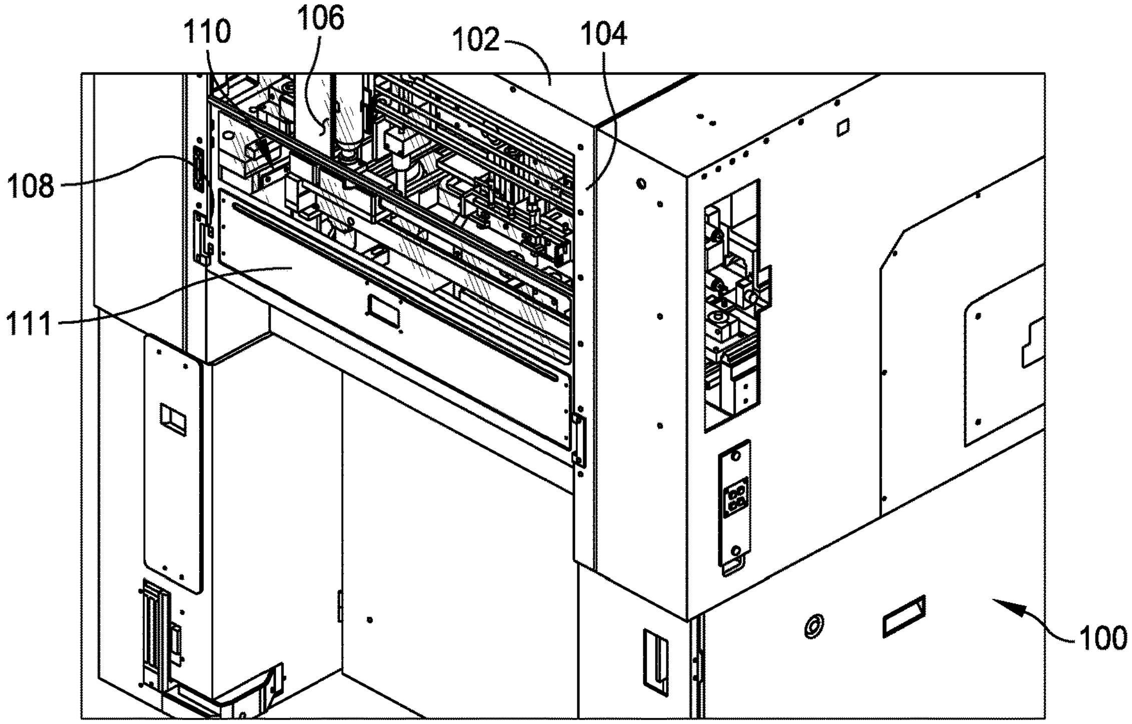
FIG. 6 is a perspective view of the portion of the cover of the stencil printer with the movable door being shown in a closed position.
Figure 7:
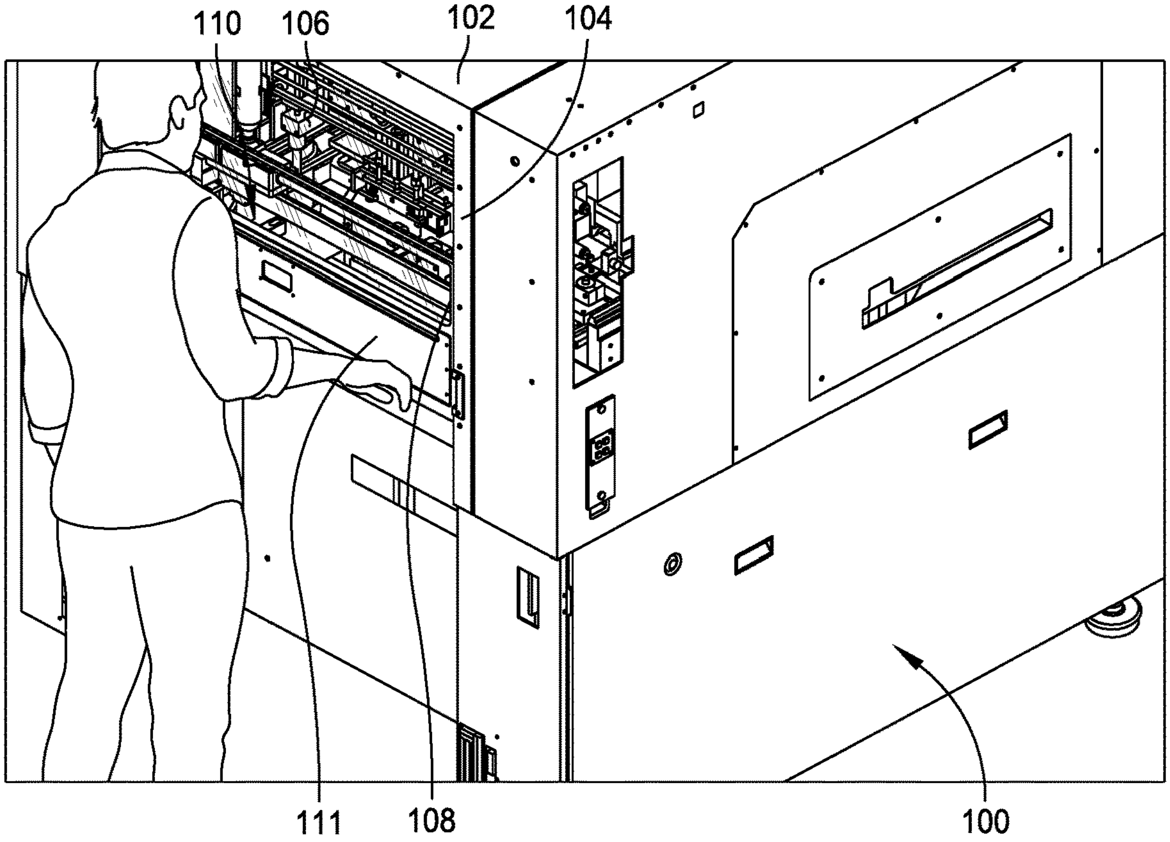
FIG. 7 is a perspective view of the portion of the cover of the stencil printer shown in FIG. 6, with an operator standing in front of the movable door.

FIG. 6 illustrates the access panel 111 of the movable door 110 shown in a closed position to enclose the working components of the stencil printer. As will be described in greater detail below, the movable door 110 of the cover 102 can be configured to be lifted by a movable cart (described below) to enable the movable cart to interface with the stencil printer 100 in such a way that the stencil printer is able to place or remove printed circuit board (PCB) support tooling, squeegee blades, and/or stencils while keeping the stencil printer inaccessible from any operator interface to the inside of the stencil printer. FIG. 7 illustrates an operator standing in front of the movable door 110, with the access panel 111 and the movable door being shown in closed positions.

Figure 8:
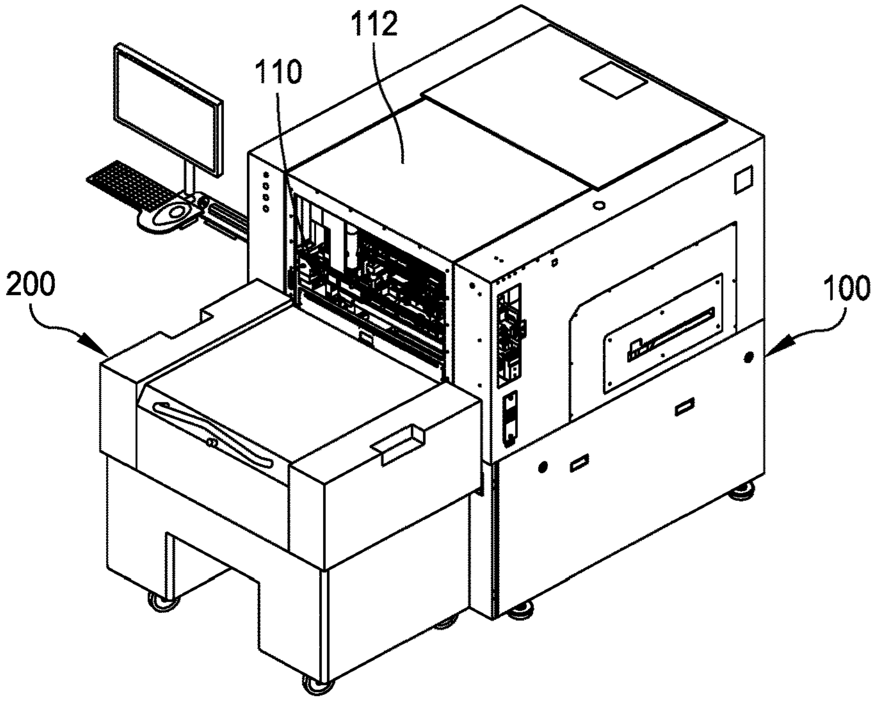
FIG. 8 is a perspective view of a stencil printer and a movable cart.
Figure 9:
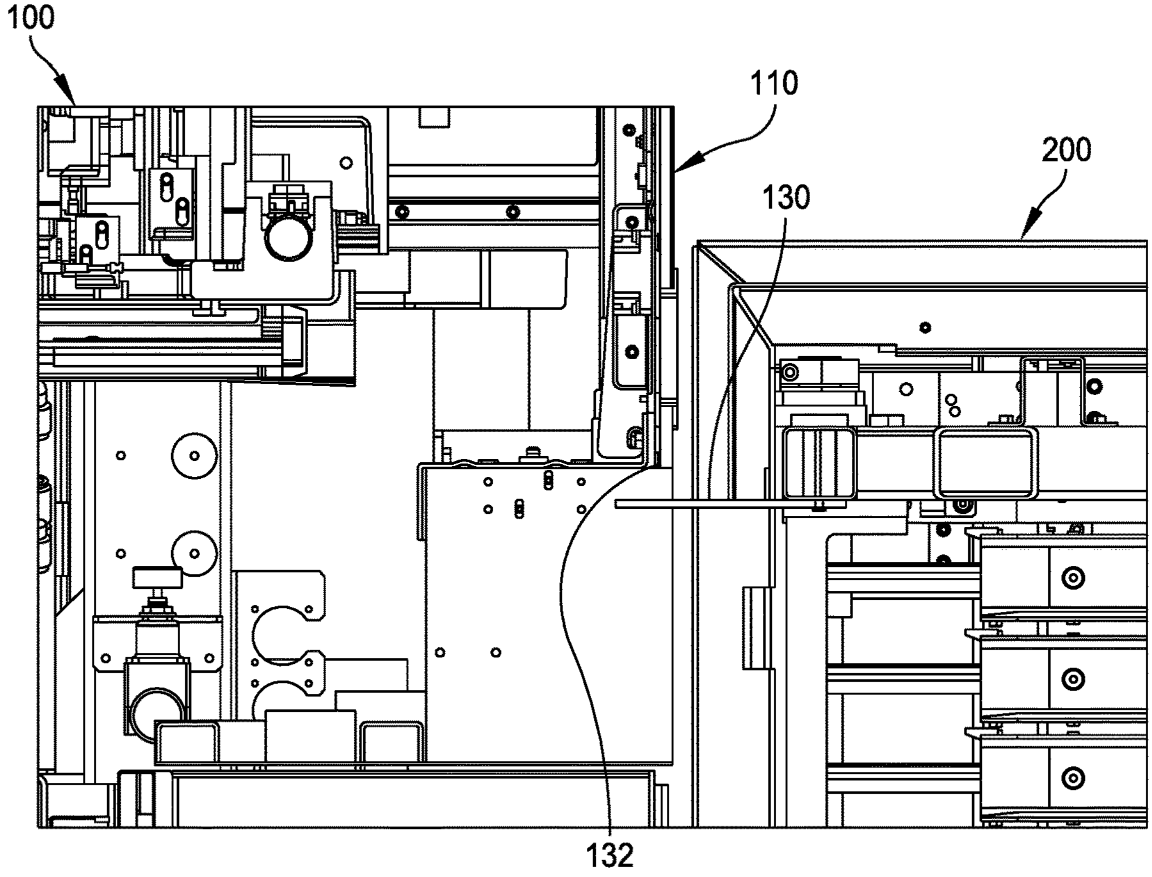
FIG. 9 is a cross sectional view of the stencil printer and the movable cart shown in FIG. 8.

Referring to FIGS. 8 and 9, a movable cart, generally indicated at 200, is shown in a docking position with respect to the stencil printer 100. As will be described in greater detail below, the movable cart 200 includes lift brackets at a front of the movable cart to lift the movable door 110 of the cover 102 of the stencil printer 100 to open the movable door. The movable cart 200 is docked to the stencil printer 100 and the lift brackets on the front of the movable cart are provided to engage an underside of the movable door 110 of the cover 102. The movable cart 200 is powered on at this point and a door interlock assembly associated with the movable door 110 is disabled. Based on the items being added or removed from the stencil printer 100, the controller of the stencil printer determines which shelf in the movable cart 200 will align with the stencil shelf in the stencil printer, for example. The movable cart 200 passively lifts the movable door 110 in the z-axis direction to a required height and once in position, the movable cart is prompted to either prepare to accept the item or items being loaded or unloaded in or out of the stencil printer 100. If prompted to unload, for example a stencil, the stencil is unloaded from the stencil printer 100 to the movable cart 200 in the y-axis directly and the movable cart stores the stencil and then indexes in the z-axis directly to load or unload the next item(s). The next item can be another stencil, and/or an item, such as tooling and/or squeegee blades on a tooling tray, or an empty tooling tray.

Figure 10:
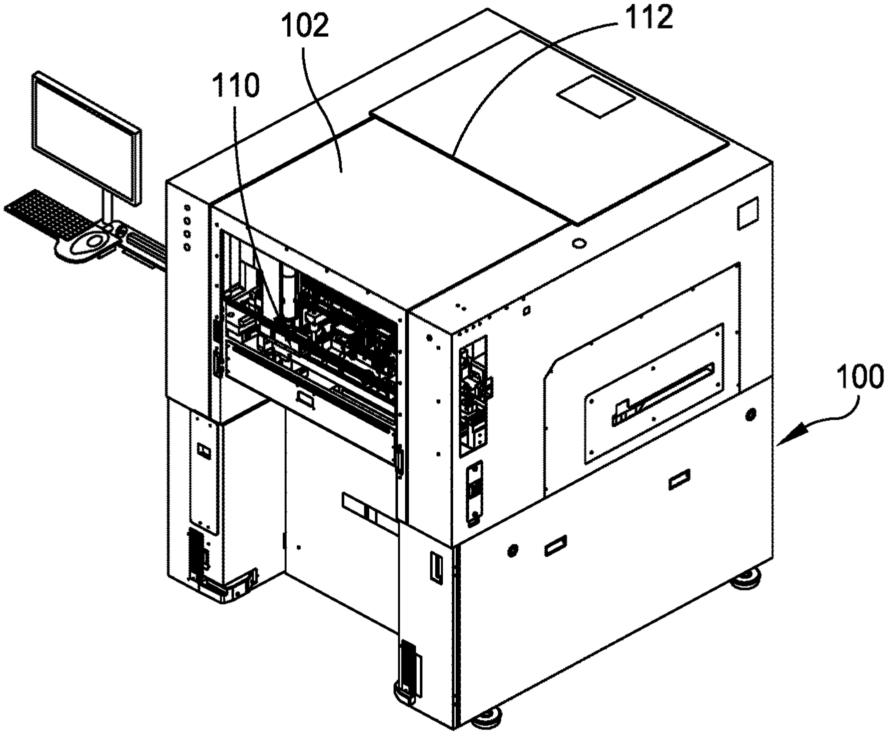
FIG. 10 is a perspective view of the stencil printer.

FIG. 10 illustrates the movable door 110 of the cover 102 of the stencil printer 100 in a maximum or fully opened position. In this position, the elongate slot 108 can accommodate up to four shelves of the movable cart 200. Depending on stencil printer requirements, the stencils and/or tooling trays may be loaded or unloaded from the stencil printer 100 to the movable cart 200 or the movable cart to the stencil printer in the y-axis direction. The movable cart 200 may be configured to index shelves of the movable cart in the z-axis direction to perform the next required operation until the changeover sequence is completed. Once completed, the movable cart 200 is configured to move the shelf supporting the stencil and/or tooling tray in the y-axis direction to a home position. Next, the movable cart 200 is configured to move the shelves in the z-axis direction to a home position to enable the stencil printer 100 to resume production. At this point, the movable door 110 of the cover 102 of the stencil printer 100 is interlocked for operator safety.

The movable cart 200 can either remain docked to the stencil printer 100 or be removed once the loading or unloading is completed.

Figure 11:
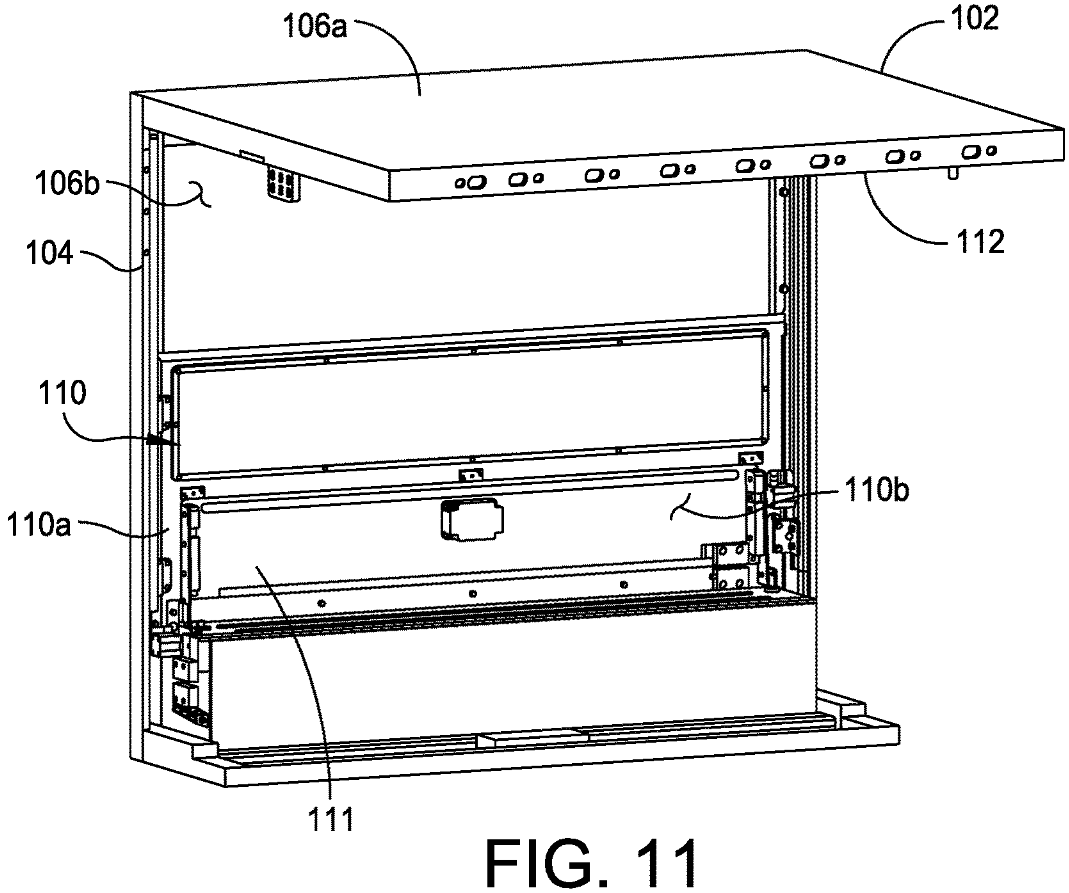
FIG. 11 is a perspective view of a cover of an embodiment of the present disclosure.
Figure 12:
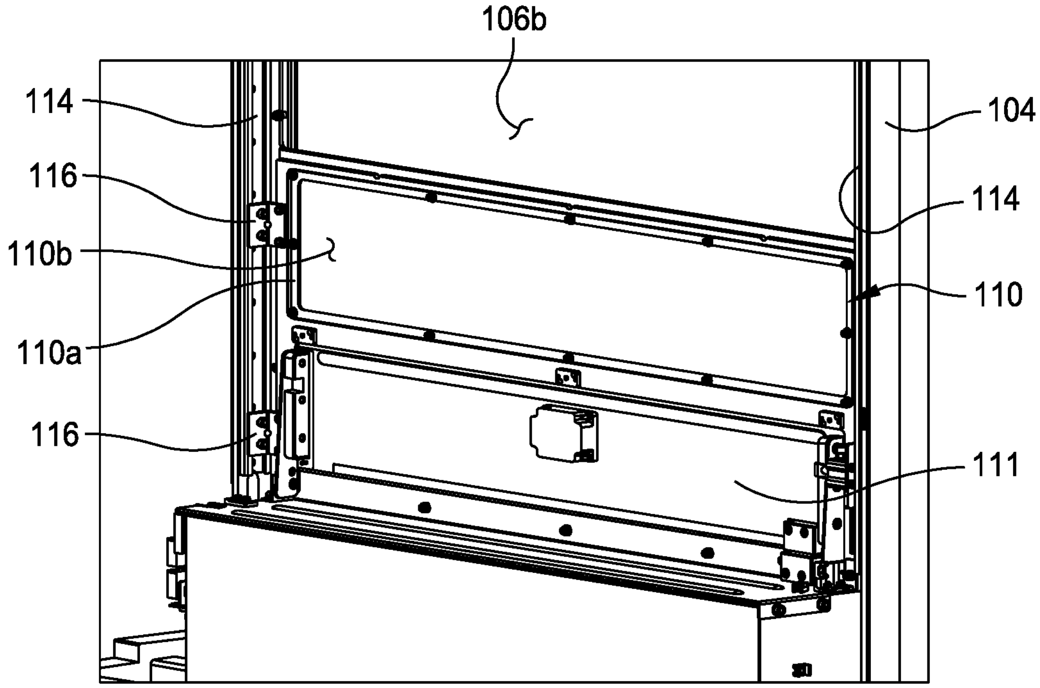
FIG. 12 is a perspective view of a movable door of the cover shown in FIG. 11.

Referring to FIGS. 11 and 12, the cover 102 of the stencil printer 100 is shown to be removed from the stencil printer 100. As mentioned above and shown, the cover 102 includes the L-shaped frame 104 having an edge that is hingedly attached to the frame of the stencil printer 100 by hinge 112. One portion of the L-shaped frame 104 has a first solid panel *106a* and another portion of the L-shaped frame has a second clear panel *106b* that extends vertically when the cover 102 is in a closed position. In one embodiment, the hinge 112 is mounted at the top rear of the frame of the stencil printer 100, which attaches to a cross member of the frame 104 of the cover 102.

With reference to FIG. 12, the movable door 110 is configured to move up and down inside of the cover 102. In one embodiment, the movable door 110 includes a rectangular frame *110a* having a see-through panel *110b* and the access panel 111. As described above, the access panel 111 is hingedly connected to the frame *110a* along a bottom edge of the access panel. The cover 102 includes two linear slides, each indicated at 114, with one slide being attached to the frame 104 of the cover 102 on an inner left hand of the cover, and the other slide being attached to the frame of the cover on an inner right hand side of the cover. The linear slides 114 are attached to the movable door 110 using four mounting brackets, each indicated at 116, which allow the movable door to move vertically up and down inside the cover 102. Specifically, two mounting brackets 116 are secured to the frame *110b* of the movable door on one side of the frame and two mounting brackets are secured to the frame of the movable door on the other side of the frame. The mounting brackets 116 are each configured to glide along the linear slide 114 to enable the up-and-down movement of the movable door 110 with respect to the frame 104 of the cover.

Figure 13:
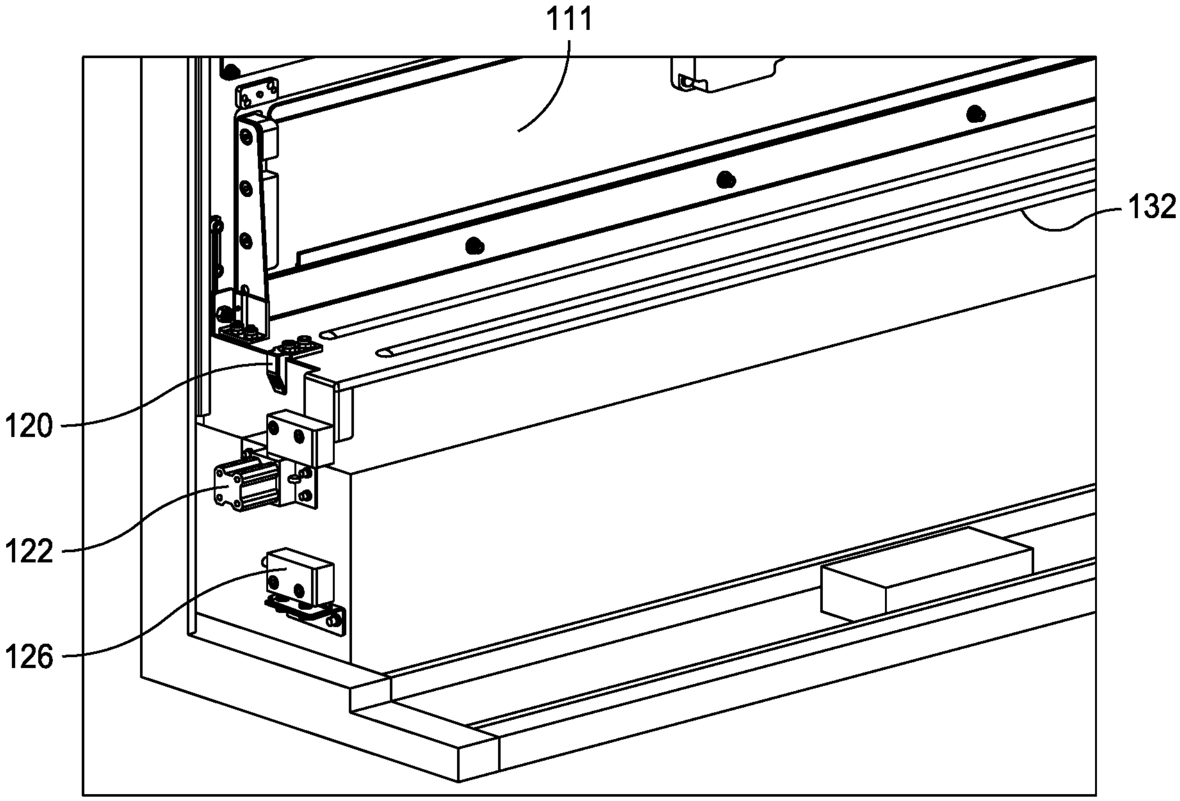
FIG. 13 is an enlarged perspective view of an interlock assembly of the movable door, with the movable door being shown in an open position.
Figure 14:
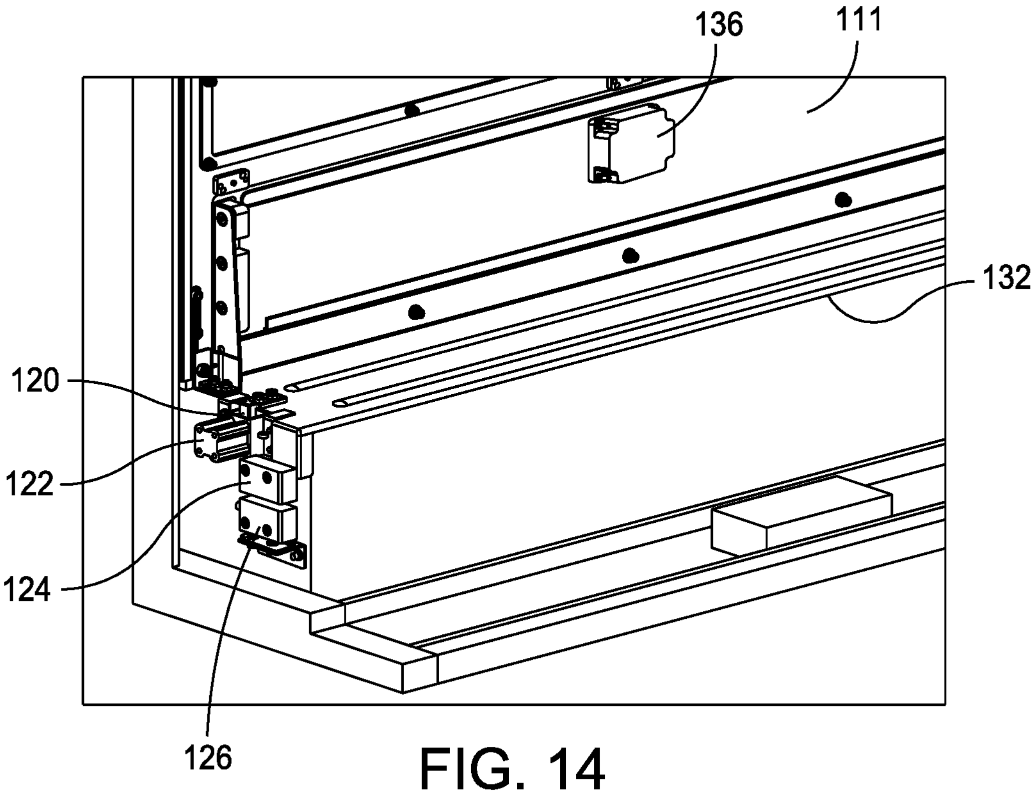
FIG. 14 is an enlarged perspective view of the interlock assembly of the movable door, with the movable door being shown in a closed position.

Referring to FIGS. 13 and 14, the cover 102 includes a pneumatic interlock assembly to secure the position of the movable door 110. As shown, the pneumatic interlock assembly includes an interlock latch 120 provided on the movable door 110 and an interlock cylinder 122 provided on the cover 102. The interlock cylinder 122 is configured to releasably secure the interlock latch 120 to secure the movable door 110 in the closed position. The pneumatic interlock assembly further includes a safety switch transmitter 124 provided on the movable door 110 and a safety switch receiver 126 provided on the cover 102. The safety switch transmitter and receiver 124, 126 are provided to ensure that the movable door 110 is in a closed position prior to operating the working components of the stencil printer 100. In another embodiment, the pneumatic interlock assembly includes a safety switch that is provided to detect that the door 110 is in a closed position. In one example, the safety switch can be a plunger-type switch.

Figure 15:
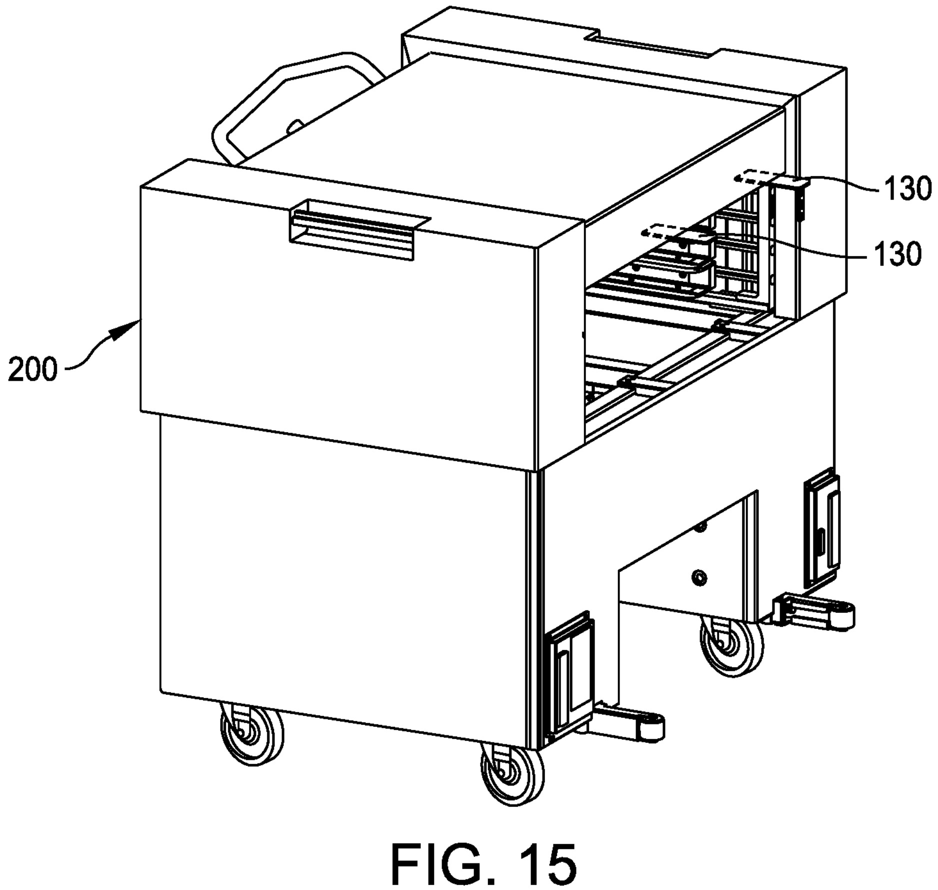
FIG. 15 is a perspective view of a movable cart of an embodiment of the present disclosure, the movable cart having brackets configured to interact with the movable door of the cover.
Figure 16:
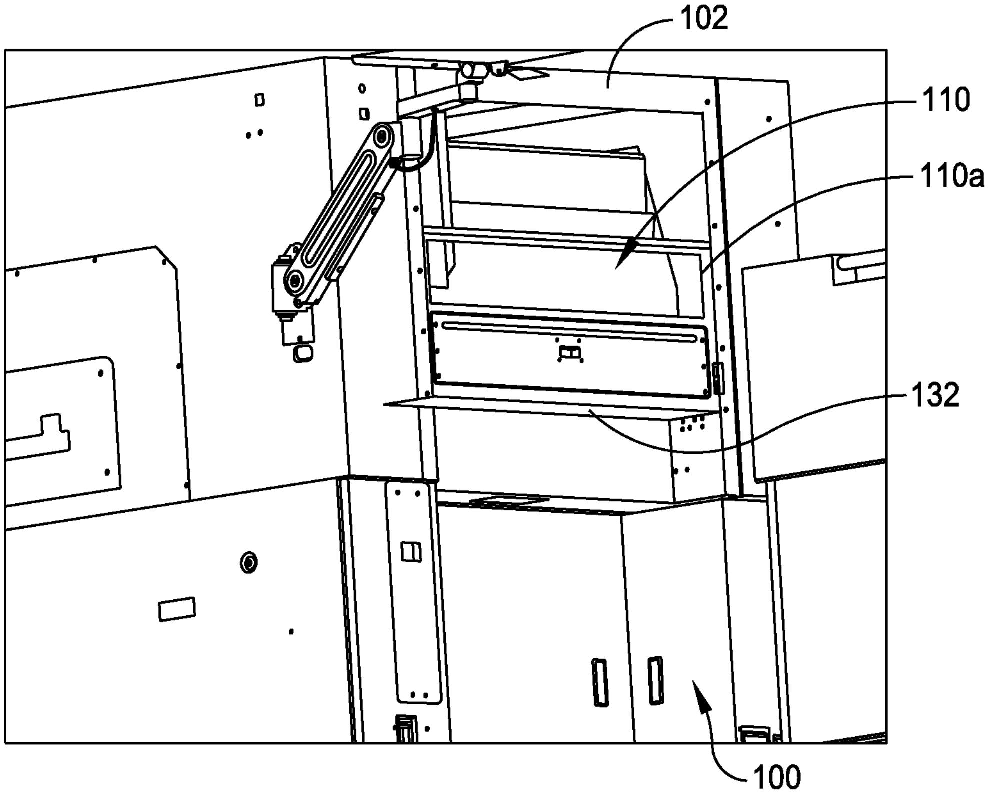
FIG. 16 is a perspective view of a portion of the movable door of the cover of the stencil printer.

Referring to FIGS. 15 and 16, as previously mentioned, the movable cart 200 includes two lift brackets, each indicated at 130, which are located on a front of the movable cart and are provided to engage an underside of the movable door 110 of the cover 102. Although provided at the front of the movable cart 200, the two lift brackets 130 can be positioned and/or arranged with respect to the movable cart in any desired manner convenient to lift the movable door 110. Once the movable cart 200 is docked with respect to the stencil printer 100, the two lift brackets 130 are positioned to slide under a bottom lip 132 of the frame *110a* of the movable door 110, which is illustrated in FIG. 16. Once the movable cart 110 is initialized and begins to move the vertical shelves on the movable cart to align with a stencil shelf in the stencil printer 100, the two brackets 130 passively lift the movable door 110 so that the appropriate stencil and/or tooling tray can be loaded into the stencil printer or unloaded from the stencil printer to the movable cart as the case may be.

Figure 17:
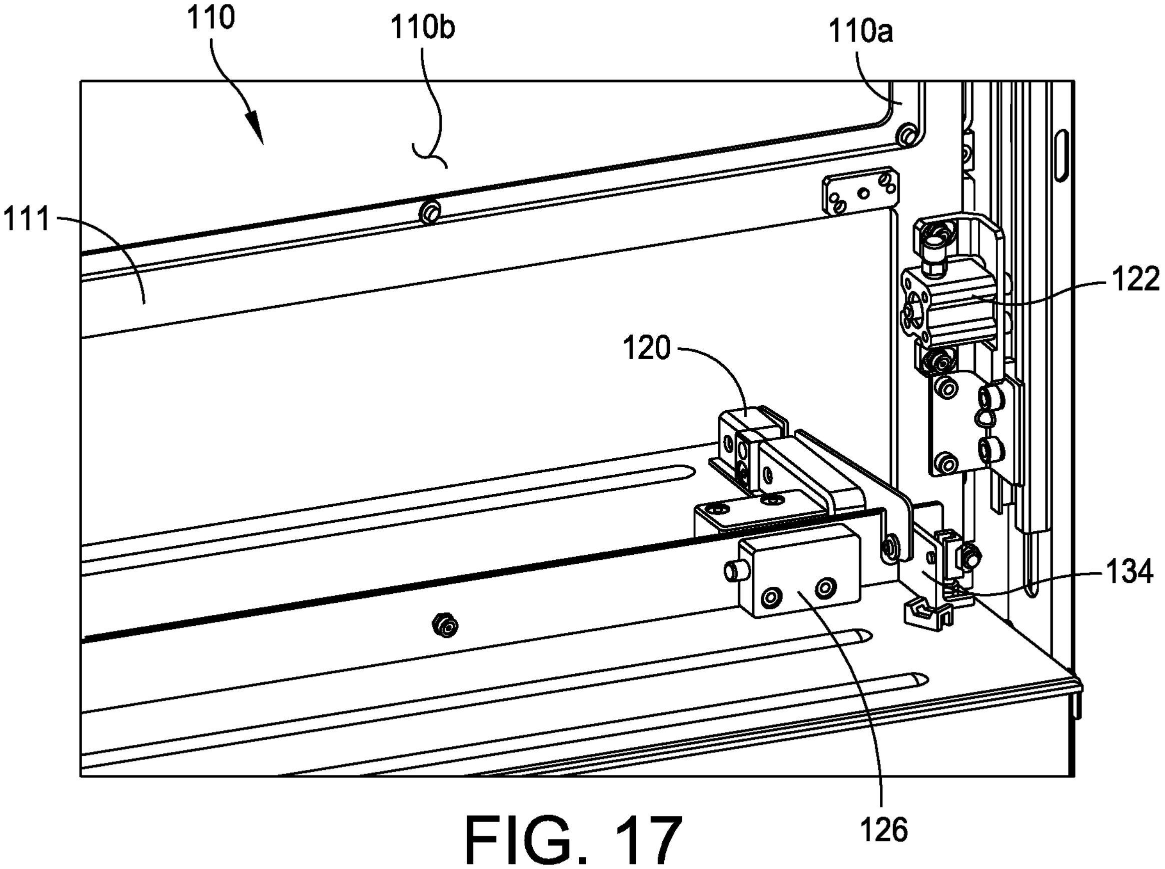
FIG. 17 is an enlarged perspective view of a portion of the movable door of the cover, with the movable door being shown in an open position.
Figure 18:
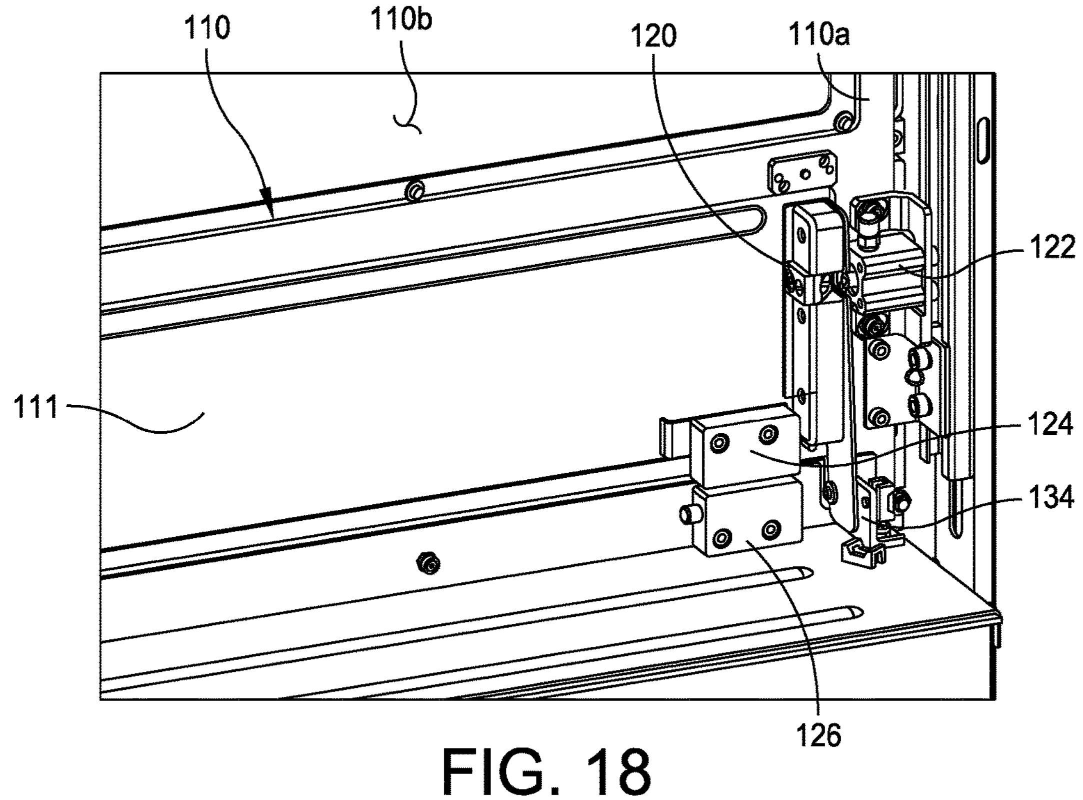
FIG. 18 is an enlarged perspective view of a portion of the movable door of the cover, with the movable door being shown in a closed position.

Referring to FIGS. 17 and 18, the access panel 111 of the movable door 110 is shown open in FIG. 17 and shown closed in FIG. 18. A hinge 134 is provided to allow the movement of the access panel 111 of the movable door between the open and close positions. The hinge 134 is secured to the frame 110*a* of the movable door 110 and the access panel 111. A similar hinge is provided on the opposite side of the access panel. The operating components of the movable door 110, including the interlock latch 120 and the interlock cylinder 122 as well as the safety switch transmitter 124 and the safety switch receiver 126 are further illustrated.

Figure 19:
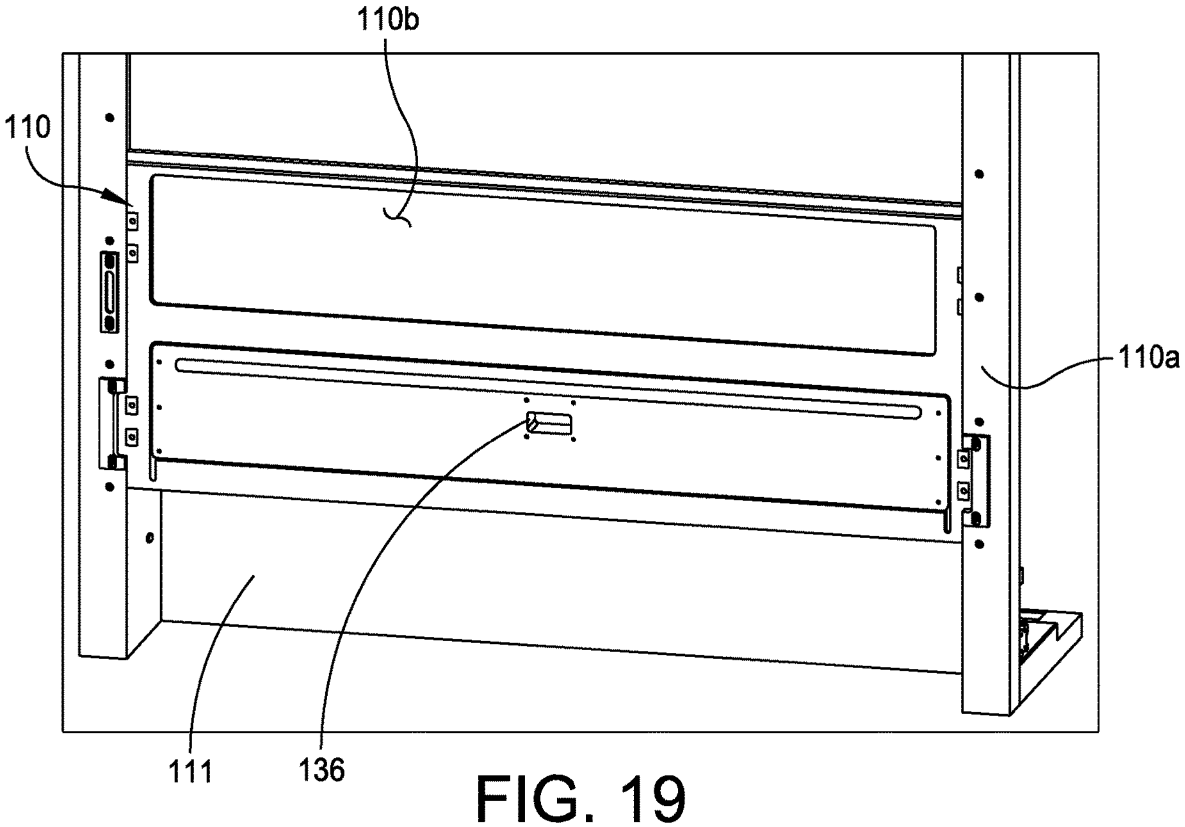
FIG. 19 is a perspective view of the movable door showing a handle provided on the movable door.

Referring to FIG. 19, an operator can open and close the access panel 111 of the movable door 110 by using a handle 136 provided on an outer surface of the access panel. The manual operation of the access panel 111 of the movable door 110 can only occur once a changeover has been initiated and the pneumatic interlock assembly is disengaged. Once this task is performed, the access panel 111 of the movable door 110 can be open, which breaks a connection with the safety switch. When the access panel 111 of the movable door 110 is opened, the stencil printer 100 is essentially inoperable until the safety switch is closed.

Figure 20:
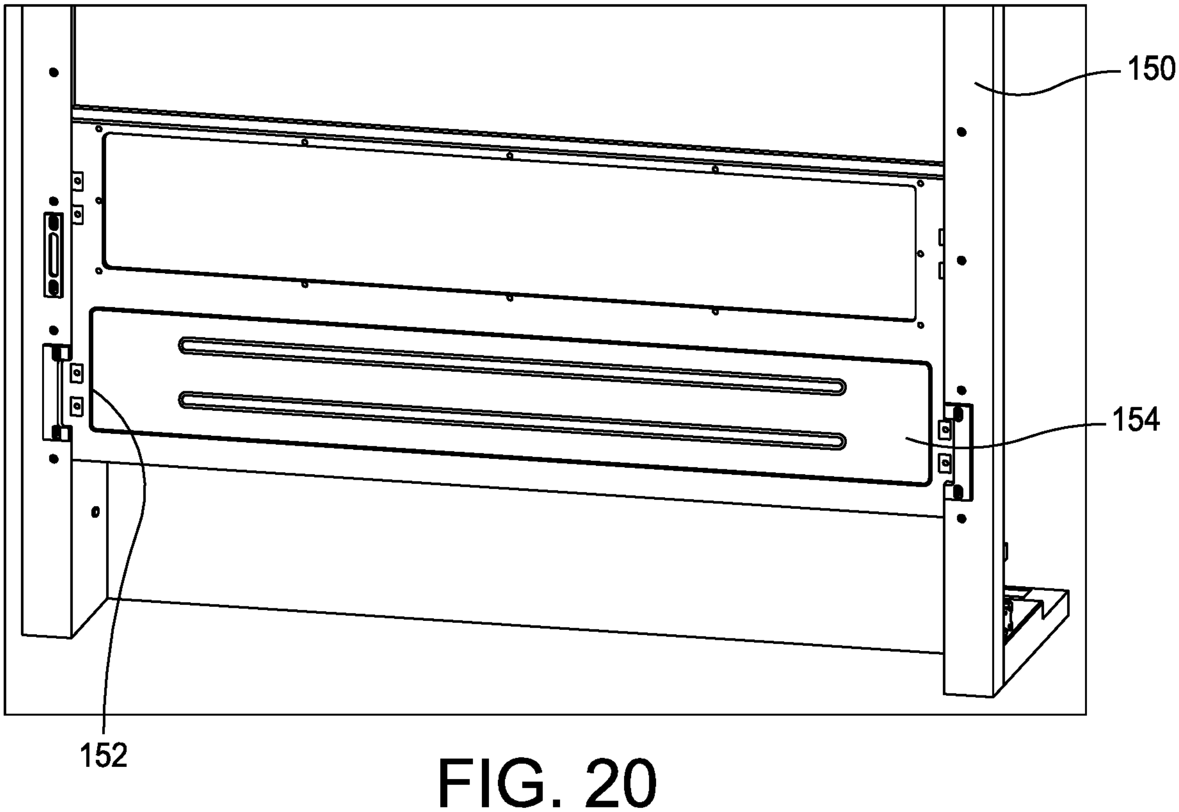
FIG. 20 is a perspective view of a movable door of another embodiment of the present disclosure, with the movable door being shown in a closed position.
Figure 21:
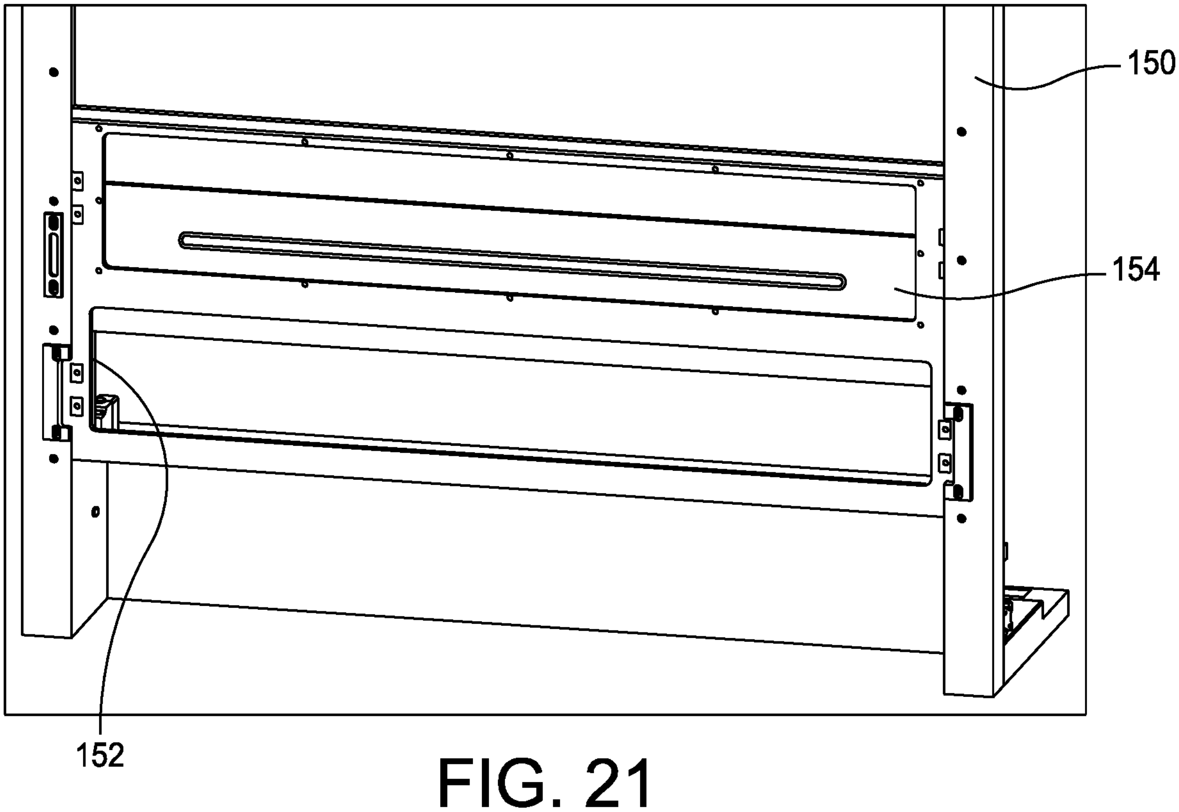
FIG. 21 is a perspective view of the movable door of FIG. 20, with the movable door being shown in an open position.
Figure 22:
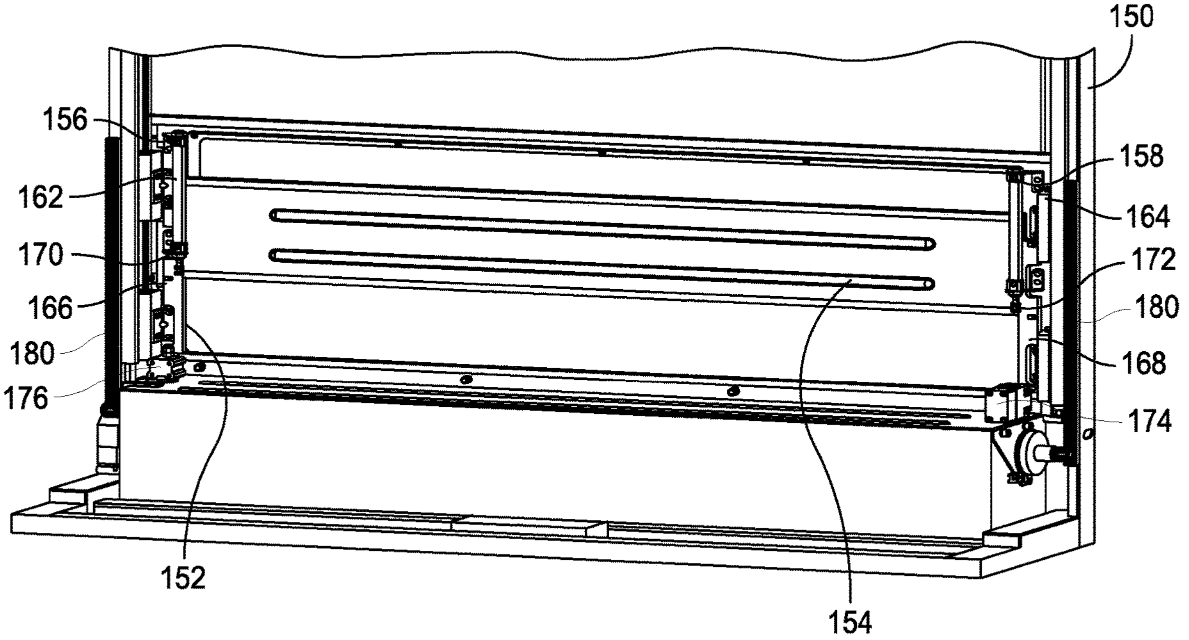
FIG. 22 is another perspective view of the movable door of FIGS. 20 and 22 taken from an opposite side of the movable door, with the movable door being shown in the open position.

Referring to FIGS. 20-22, in another embodiment, a cover 150 includes an elongate slot 152 and a movable door 154, which is slidably attached to the cover and movable between an open position (FIG. 20) and a closed position (FIG. 21). FIG. 22 illustrates the other side of the movable door 154, with the movable door being shown in the open position. The construction of the cover 150 and the movable door 154 is similar to the cover 102 and movable door 110 assembly shown and described above. The movable door 154 is configured to move up and down by automatically, either by an operator or the controller of the stencil printer.

As shown in FIG. 22, the movable door 154 is secured to the cover 150 by a first set of fixed brackets secured to the cover, with one fixed bracket 156 being secured to the cover on one side of the elongate slot 152 and the other fixed bracket 158 being secured to the cover on an opposite side of the elongate slot. Each bracket 156, 158 of the first set of fixed brackets includes a vertically mounted cylinder 162, 164, respectively. Each cylinder 162, 164 is guided by a vertically mounted door guides or retainers 166, 168, respectively. There is a second set of brackets attached to the movable door 154 and attached to respective cylinder shafts of the cylinders 162, 164 to drive the up-and-down movement of the movable door, with one bracket 170 being secured to the movable door on one side of the movable door and the other bracket 172 being secured to the movable door on an opposite side of the movable door.

The movable door 154 further includes a rack and pinion and damped rotational assembly 180 so that when the door is lifted, the door returns safely to the home (closed) position. Stated another way, the movable door is free to move in the up or open direction and when moved to the down or closed direct, the rack and pinion and damped rotational assembly 180 provides a resistance to the downward movement of the movable door to prevent the movable door from slamming shut.

To open the movable door 154, the operator (or software associated with the controller of the stencil printer) issues a command to open the movable door. In one embodiment, the operator can enter the command on a graphic user interface (GUI) associated with the display of the stencil printer. Once this is done, the stencil printer will be inhibited when a safety rated sensor/switch 174 is decoupled from the movable door 154. This movable door 154 is secured in a closed position to close access to the elongate slot 152 by an interlock assembly 176 and the safety rated sensor/switch 174.

Embodiments of the present disclosure further may include a method to facilitate the automated loading and/or replacing of required process related components in the machine when interfaced with the automation cart.

In one embodiment, a full stencil printer change of replaceable items requires removal of stencil and unloading squeegee blades and tooling from the stencil printer and subsequently loading new squeegee blades and tooling and inserting a new stencil into the printer. In one example, a sequence of replacing items in the stencil printer includes the following order. The existing stencil is removed from the stencil printer. Next, an empty tooling tray is inserted into the stencil printer using the print head and the print head gantry of the stencil printer. The empty tooling tray can be presented by the operator or by the movable cart. The position of the tooling tray is verified by using the vision registration verification software associated with the controller. As mentioned above, the imaging system can be employed to take an image of the empty tooling tray and send the image to the controller for verification.

After determining the location of the tooling tray, the front and rear squeegee blades and removed and placed into the tooling tray. Next the tooling is picked up and placed into the tooling tray by using tooling pins associated with the print head and the print head gantry. Once the squeegee blades and the tooling are placed in the tooling tray, the tooling tray is removed from the stencil printer.

Next, a loaded tooling tray is inserted into the stencil printer using the print head and the print head gantry of the stencil printer. Again, the loaded tooling tray may be presented to the stencil printer by the operator or by the movable cart. Specifically, the loaded tooling tray includes new front and rear squeegee blades and new tooling that are intended to replace the used squeegee blades and the used tooling that were previously removed from the stencil printer. Next, the tooling tray is positioned within the stencil printer using the stencil printer vision registration verification software associated with the controller. As with positioning the empty tooling tray, the imaging system can be employed to take an image of the loaded tooling tray and send the image to the controller for verification.

Next, the new tooling is placed on the stencil printer work holder table, e.g., the support assembly 28, by using the tooling pins associated with the print head and the print head gantry of the stencil printer. Next, the new front and rear squeegee blades are picked up and installed on the print head. After installing the new tooling and squeegee blades, the tooling tray is removed from the stencil printer. And finally, the new stencil is inserted into the stencil printer. The sequence of replacing items in the stencil printer is completed at this point.

In some embodiments, the print head assembly of the stencil printer, e.g., print head assembly 20, includes an end effector, which can be configured to pick up and release items from the tooling tray. As previously described, with stencil printer 10, the print head assembly 20 is mounted on the print head assembly gantry 22, which moves the print head assembly in the y-axis direction under the control of the controller 14. The print head assembly 20 is configured to move in the z-axis direction as described above.

In one embodiment, the end effector can be configured to pick up and release squeegee blades, for example. The end effector is configured to toollessly engage and disengage the squeegee blades to attach and remove the squeegee blades from the print head assembly 20. In one embodiment, the tooling tray can be configured with a spring-loaded locking mechanism to secure a squeegee blade holder of the squeegee blades to the end effector of the print head assembly 20. A method of passively picking up and dropping off squeegee blades without needing additional axes or actuators can be performed by the end effector.

In one embodiment, the end effector includes a rectangularly-shaped body that is secured to the print head assembly by a pair of connecting rods. The end effector further can be configured with a pair of downwardly extending pins, which are configured to releasably secure the squeegee blades. The pins can also be used to manipulate a stencil and/or tooling tray by moving the stencil and/or tooling tray laterally within the stencil printer.

In one embodiment, the movable cart includes a frame or housing configured to support replacement and/or replenishment items. The frame may be generally rectangular and may be supported on wheels or casters. In one embodiment, the movable cart is configured to be manually moved by an operator by pushing the housing of the movable cart. In this embodiment, the movable cart can be configured with a push bar or a handle. In another embodiment, the movable cart is configured to be automatically moved, either by remote control or by an automated control associated with the movable cart, the stencil printer, the production line, and/or some other dedicated control. In this embodiment, the movable cart can include wheels that are driven by a suitable motor and drive train, and a control associated with the movable cart, the stencil printer, the production line, and/or some other dedicated control is configured to control the movable cart. The movable cart further can include one or more sensors and/or a vision system, e.g., cameras, to guide the movable cart from a stockroom, for example, to the stencil printer.

As discussed, the movable cart is configured with one or more shelves to store items for the stencil printer. For example, the shelves can be specifically designed to support new and used stencils, and/or other items, such as new and spent/used paste cartridges, new and used squeegee blades, and new and used tooling. One or more shelves can be configured to move vertically and indexed within the housing to achieve a height suitable to operate with the stencil printer. Some shelves may be designated as “clean shelves” to support clean or new items ready to be used within the stencil printer. Some shelves may be designated as “dirty shelves” to support used items to be taken away from the stencil printer. The shelves can be spaced apart from one another specific distances to receive various items. For example, the shelves can be spaced apart ⅜-inch to 1½-inch from one another to accommodate stencil frame thicknesses and/or tooling tray thicknesses.

It should be understood that although the shelves are illustrated to be horizontally oriented, the shelves can be disposed in a vertical orientation in which stencils are inserted into and removed from the shelve slots in a vertical plane.

The movable cart can be configured with one or more devices used to transport items from the movable cart to the stencil printer 10 and from the stencil printer to the movable cart. For example, the device can include grippers or transport arms to assist in removing and inserting items from the movable cart, such as stencils.

The movable cart can be configured with an interface, which is designed to dock within a docking station provided on the stencil printer. In one embodiment, the movable cart includes an interface, which is configured to dock within a docking station of the stencil printer, both from a mechanic interface and an electronics communication interface. In a particular embodiment, the movable cart can be configured with a unique mechanical interface that mates with a unique mechanical interface of the stencil printer. The unique mechanical interfaces can include geometric features. In another embodiment, the movable cart can be configured with pins that are received within guides associated with the stencil printer to register the movable cart with the stencil printer prior to fully docking the movable cart. Other types of guides can be used, such as electrical/magnetic guides, vision guides, sensors, latches, etc. The movable cart, when docked within the docking station of the stencil printer, can physically engage the stencil printer or be spaced from the stencil printer.

In some embodiments, the movable cart includes a controller that is adapted to control the operation of the movable cart based on operational parameters obtained by the controller. The controller can be configured to communicate with the controller of the stencil printer, and/or a controller associated with the production line. In one embodiment having multiple movable carts, the controller may embody a plurality of controllers provided in each movable cart that communicates with one another over a controller area network (CAN) Bus or other type of network. In other embodiments, a master controller may be provided to control the operation of the controllers of the movable carts. Each movable cart may be provided with a display, which is operably coupled to the controller. The display is adapted to display the operational parameters of the movable cart, such as, but not limited to, the number of clean and used stencils or items provided on tooling trays. Suitable monitors may be provided to acquire such information. Alternatively, or in addition to the foregoing embodiment, the operational parameters may be displayed on the display provided within the stencil printer, and/or a display associated with the production line.

In other embodiments, the movable cart may be controlled by the controller of the stencil printer and/or a controller associated with the production line. The controller can be a controller dedicated to one or more movable carts.

In some embodiments, material identification for items on the movable cart can include a device to manipulate the item and a scanner to scan and identify the item. In one embodiment, a barcode to identify the items can be implemented. For example, the barcode can include a 1D scanner for UPC codes, a 2D scanner for QRC codes, a printed label applied on the item or a laser etched label etched on the item. In another embodiment, an RFID system to identify the items can be implemented. For example, the RFID system can include an RFID tag applied to the item and an RFID reader associated with the movable cart. With an RFID system, line-of-site between the reader and the item is not required. Moreover, scanning is not required to identify all items within the movable cart. In another embodiment, an imaging or vision system to identify the items can be implemented. The vision system could be an imaging system similar to the imaging system 30 associated with the stencil printer 10, and can be associated on the stencil printer, off the stencil printer or on the movable cart.

In some embodiments, a database is provided to keep track of items stocked on the movable cart. In one embodiment, the database may include an open application (App) architecture and be configured to push data to the stencil printer. The movable cart can be configured to communication with the stencil printer to push/pull data to stencil printer and/or the production line or configured to communicate with the production line directly. The database can include job information or material information. The database further can communicate with a manufacturing execution system (MES) associated with the production line, the stencil printer, or both. The MES system can be configured to know which materials are required for a production run. The movable cart can be configured to communicate with the MES system to adjust delivery of items to the stencil printer.

The database further can be configured to retrieve information about items based on identification, e.g., a barcode number. In one embodiment, a central management system can be provided in which the stencil printer and/or the movable cart is programmed to accept material coming from movable cart. The movable cart is programmed to update the database to identify the materials on the movable cart, load information into the database associated with the movable cart and/or the stencil printer from a network, which is tied back to the MES system.

The database further can be configured to store additional information, such as usage and consumption. The database can be configured to store information locally or remotely, and can be configured to store data associated with one or more production runs. For example, the database can be configured to obtain and store data including but not limited to traceability of stencils and/or tooling trays.

The database can be configured to share prediction data when replacement/replenishment is needed. For example, with respect to storing information related to stencils and/or tooling trays, the database can be configured to perform one or more operation. The database can be configured to share prediction data for other changeable/consumable items, such as for the stencils and/or tooling trays.

The database can be configured to store data associated with lot traceability. In addition, RFID or mechanical keying of a board or a stencil frame of the stencil is provided to ensure correct alignment/orientation/direction/front-back/top-bottom when these items are inserted into the stencil printer. This information can be used to verify correct orientation and/or fit before the items are transported from the warehouse and/or before the items are installed in the stencil printer. A low-cost reader can perform this function.

In some embodiments, the movable cart can be configured to store materials. The movable cart can be configured to be flexible to accommodate where the materials come from and where the materials go to. In addition, the movable cart can be configured to identify where a particular material is located on the movable cart. In certain embodiments, the location, whether by auto delivery or manual delivery, is remote, local, on the movable cart, and/or on the stencil printer.

In some embodiments, the movable cart can be configured to perform inventory control. Specifically, the movable cart can be configured to identify where material is located, how much material is used, how the material is used, when the material is used, tie the material and information about the material to a customer inventory control system, and track material type consumed per board or lots of boards.

In some embodiments, the movable cart can be configured to organize items stored on the movable cart. As mentioned above, in one embodiment, one movable cart can be provided to store, transport and deliver multiple resources, including but not limited to stencils and/or tooling trays. In another embodiment, the movable cart can be configured to store, transport and deliver a single resource or item to the stencil printer. For example, the movable cart can be configured to store multiple stencils and/or tooling trays. The movable cart can be configured to service multiple production lines. In another embodiment, the movable cart can be configured to service one stencil printer.

In some embodiments, the movable cart can be configured to transport items from the movable cart to the stencil printer and from the stencil printer to the movable cart, and be able to account for elevation differences between the movable cart and the stencil printer. The transportation can be automated or manual. In one embodiment, movable cart can be moved by automatically guided vehicle (AVG) technology associated with the movable cart or remotely controlled. In another embodiment, the movable cart can be configured to move autonomously. In another embodiment, the movable cart can be configured to be moved manually. In yet another embodiment, the movable cart can be configured to move items stored on the movable cart automatically and/or manually. For example, the movable cart can be configured to move items automatically, and can provide for an interruption of a pre-planned activity in which the items are moved manually.

In some embodiments, timing associated with performing transportation functions of the movable cart can be programmed to account for shift change, e.g., a personnel shift, scheduled maintenance, on demand activities, e.g., a recipe change, and predictive events (just-in-time replacements). The timing can be programmed to meet multiple line balance control requirements, with one or more movable carts and to meet real-time on-demand material supply demands on the production line.

In some embodiments, the movable cart is configured to perform inspection. For example, the movable cart can inspect on cart and off cart items including stencils and/or tooling trays. In one embodiment, a vision system associated with the movable cart can be configured to obtain images of the items. The vision system in conjunction with the controller, can be configured to inspect for cleanliness, damage, wear, and identification readability, e.g., is the barcode label worn, dirty or torn. The vision system can embody any type of 2D, 3D or color camera.

In some embodiments, the movable cart is configured to interface with the stencil printer, both from a mechanical interface and an electronics communication interface. In one embodiment, the movable cart can be configured with a unique mechanical interface that mates with a unique mechanical interface of the stencil printer. The unique mechanical interfaces can be geometric features. In another embodiment, the movable cart can be configured with pins that are received within guides associated with the stencil printer to register the movable cart with the stencil printer prior to fully docking the movable cart. The pins and guides can be reversed, with the pins provided on the stencil printer and the guides provided in the movable cart. Other types of guides can be used, such as electrical/magnetic guides, vision guides, sensors, latches, etc.

In some embodiments, the interface and the docking station can be configured with a clamping system to maintain the movable cart in place with respect to the stencil printer. For example, a magnetic clamping system can be employed.

In some embodiments, the stencil printer can be configured with multiple docking stations, e.g., five docking stations. The docking station can be provided at a front of the stencil printer or at a back of the stencil printer.

The movable cart and/or the stencil printer can be configured to verify whether the movable cart can be docked and interface with the stencil printer. In one embodiment, verification can be provided to confirm that the movable cart is in position and ready to interface with the stencil printer. This verification process can further determine whether correct materials are on the movable cart and whether the movable cart material information can be received from MES system, or locally identified. If not correct, the movable cart can be configured to activate an alarm and/or alert an operator if wrong or damaged materials are on the movable cart.

In some embodiments, the movable cart can be configured with actuation devices or actuators to move items onto and off of the movable cart once the movable cart is docked to the stencil printer. Embodiments of the actuators can be implemented on the movable cart, the stencil printer. In another embodiment, the items can be manually loaded and unloaded from the movable cart.

In some embodiments, the movable cart can be configured to interface with a production line. With this embodiment, the operator of the production line can confirm the correct location and acknowledge receipt of the movable cart on the stencil printer.

In some embodiments, the movable cart can be configured to communicate with the stencil printer, the production line, and/or select machines within the production line via an open platform. Communication systems can include a wired system, a wireless system (through a common network, mesh, Bluetooth, Wi-Fi, Zigbee, WAN, Nodes, Li-Fi, etc.), a combination of wired and wireless systems, and infrared (IR) system.

In some embodiments, the movable cart can be configured with a dedicated power source. In one embodiment, the movable cart includes a battery configured to power automated components provided in the movable cart, e.g., mechanisms used to move stencils and/or tooling trays into and out of the movable cart. In other embodiments, the movable cart can be configured with an uninterruptible power supply. The power source can be configured to support actuation while "docked" (high-voltage from stencil printer when docked, otherwise low-voltage when undocked). The power source can be configured to recharge for autonomous operations, e.g., recharge a battery from power provided by the stencil printer.

In some embodiments, the movable cart can be configured to function with the stencil printer. For example, the movable cart can be configured to provide a handshaking function with the stencil printer 10 prior to a transfer of an item, e.g., "please give me stencil #1234." The movable cart and the stencil printer can be configured with a communication protocol and/or a library reference on what is available to consume. The movable cart can be configured to determine whether the movable cart has correct items. The handshaking function can be configured to ensure the correct transfer of an item, e.g., "here's stencil #1234," and/or the subsequent transfer of an item, e.g., "I now have stencil #1234." In one embodiment, a mobile device can be configured to scan and identify items in the movable cart, and determine, for example, whether the items are ready for use, require cleaning, etc.

In some embodiments, the movable cart can be configured to address errors associated with handling and recovering items in the movable cart. For example, the movable cart can be configured to detect an incomplete action by one party, an incomplete transfer of an item, e.g., a stuck or jammed item, a dropped transfer, e.g., "I passed stencil #1234 to you, don't you have it?," and a manual intervention or override, e.g., "here, let me help you." In one embodiment, a controller associated with the movable cart can be configured to perform static discharge control, data recovery and/or security.

In some embodiments, the movable cart can be configured with a higher level of capability. In addition to indexing all the equipment to the correct height, the movable cart would need to pull in/push out all equipment for machine gantries to attach.

In some embodiments, existing machine gantries, rails and print head of the stencil printer can be configured to shuttle items in and out.

In some embodiments, the movable cart can be configured to communication with the stencil printer, the production line and a warehouse associated with the production line.

In some embodiments, the movable cart can be configured with an electrical/pneumatic interface.

In some embodiments, the movable cart can be configured to track consumables—new and used on the movable cart, e.g., stencils and/or tooling trays, including location, temperature and other data.

In some embodiments, the movable cart can be configured to store and supply stencils and/or items on tooling trays for duration of a production run.

In some embodiments, the movable cart can be configured to scan all consumables with a suitable scanning device, such as a barcode reader or RFID reader. In some embodiments, the movable cart can be configured with an indexing mechanism to properly locate consumables.

In some embodiments, the movable cart can be configured with a bypass switch to disconnect the movable cart from the stencil printer 10 if the movable cart has an issue.

In some embodiments, the movable cart can be configured to be moved manually or by an automated guided vehicle (AGV).

In some embodiments, the movable cart can be configured to dock and interface with the stencil printer.

In some embodiments, the movable cart can be configured to service multiple stencil printers.

In some embodiments, the movable cart can be configured to be dedicated to one consumable item, e.g., stencils, or multiple consumable/changeover items.

In some embodiments, the movable cart can be configured to transport and present the consumables to be cleaned at a remote station.

In some embodiments, the movable cart can be configured to be refilled at a stockroom associated with a warehouse.

In some embodiments, the movable cart can be configured to be climate controlled, either actively or passively.

In some embodiments, the movable cart can be configured be controlled by an application (App) capable for smartphone integration.

As used herein, an "automated" or "fully automated" changeover describes the replacement or replenishment of an item without human intervention.

As used herein, a "partially automated" changeover describes the replacement or replenishment of an item with some or limited human intervention.

As used herein, "transport" or "transporting" describes moving an item from one position to another, either manually or with a machine.

As used herein, "install" or "installing" describes the process of placing an item in a position ready for use.

As mentioned above, the movable cart can be employed to replace other items within the stencil printer. For example, the stencil wiper assembly includes consumables, e.g., paper and solvent, which can be automatically replaced by the movable cart.

The concepts disclosed herein may be employed in other types of equipment used to fabricate electronic substrates, including dispensers, pick-and-place machines, reflow ovens, wave soldering machines, selective solder machines, inspection stations, and cleaning stations. For example, the concepts directed to replacing paste cartridges can be employed in dispensers used to dispense viscous material. In another example, the concepts directed to replacing tooling can be employed in dispensers and in pick-and-place machines used to mount electronic components onto electronic substrates. In another example, the concepts directed to replacing items can be employed in replacing solder within wave soldering and selective soldering machines and cleaning product within cleaning stations.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A printing system comprising:
- a stencil printer for printing an assembly material on an electronic substrate, the stencil printer comprising
  - a frame,
  - a stencil coupled to the frame, the stencil having apertures formed therein,
  - a support assembly coupled to the frame, the support assembly being configured to support the electronic substrate in a print position beneath the stencil,
  - a print head gantry coupled to the frame,
  - a print head assembly supported by the print head gantry in such a manner that the print head assembly is configured to traverse the stencil during print strokes, the print head assembly including a print head having a squeegee blade assembly configured to roll solder paste along the stencil, and
  - a cover coupled to the frame to enclose operating components of the stencil printer, including the stencil, the support assembly, the print head gantry and the print head assembly, the cover being hingedly secured to the frame and configured to move from an open position in which an interior of the stencil printer is accessible to a closed position in which the operating components are enclosed, the cover including an elongate opening formed therein and a movable door configured to selectively close the elongate opening, the movable door being configured to move between a closed position and an open position, the elongate opening being sized to enable the stencil and/or a tooling tray to pass through; and
- a movable cart configured to dock with respect to the stencil printer, the movable cart comprising
  - at least one lift bracket located on a front of the movable cart, when the movable cart is docked with respect to the stencil printer, the at least one lift bracket being positioned to engage an underside of the movable door of the cover to lift the movable door from the closed position to the open position.

2. The printing system of claim 1, wherein the cover further includes a cover frame and at least one panel secured to the cover frame.

3. The printing system of claim 2, wherein the movable door is slidably coupled to the cover frame to enable movement of the movable door with respect to the cover between the closed position and the open position.

4. The printing system of claim 3, wherein the movable door includes a movable door frame and at least one panel secured to the movable door frame.

5. The printing system of claim 4, wherein the cover further includes a linear slide mounted on the cover frame of the cover, and wherein the movable door further includes a mounting bracket secured to the movable door frame of the movable door.

6. The printing system of claim 4, wherein the cover further includes a first linear slide secured to the cover frame of the cover on one side of the movable door and a second linear slide secured to the cover frame of the cover on the other side of the movable door.

7. The printing system of claim 6, wherein the movable door further includes at least one first mounting bracket secured to the movable door frame of the movable door on one side of the movable door and at least one second mounting bracket secured to the movable door frame of the movable door on the other side of the movable door.

8. The printing system of claim 4, wherein the cover further includes a pneumatic interlock assembly to secure the position of the movable door in the closed position.

9. The printing system of claim 8, wherein the pneumatic interlock assembly includes an interlock latch provided on one of the movable door and the cover and an interlock cylinder provided on an other of the movable door and the cover, the interlock cylinder being configured to releasably secure the interlock latch to secure the movable door in the closed position.

10. The printing system of claim 8, wherein the pneumatic interlock assembly includes a safety switch to ensure that the movable door is in a closed position prior to operating the stencil printer.

11. The printing system of claim 1, wherein the movable door includes an access panel hingedly mounted to a frame of the movable door, the access panel being configured to be manipulated manually between open and closed positions.

12. The printing system of claim 1, wherein the movable door includes an assembly configured to provide a resistance to a downward movement of the movable door.

13. The printing system of claim 1, wherein the movable door is slidably mounted along opposite edges of the elongate opening and sized to enclose the elongate opening when in a closed position.

14. The printing system of claim 1, wherein the at least one bracket includes two lift brackets that are spaced apart from one another.

15. The printing system of claim 1, wherein the stencil printer further comprises a controller coupled to the movable door, the controller being configured to control movement of the movable door between the closed position and the open position when the movable cart is undocked from the stencil printer.

* * * * *